(12) United States Patent
van Egmond

(10) Patent No.: US 11,654,628 B2
(45) Date of Patent: May 23, 2023

(54) SYSTEM, METHOD AND APPARATUS FOR FLUIDIZED BED ADDITIVE MANUFACTURING

(71) Applicant: Jan Willem van Egmond, Charleston, WV (US)

(72) Inventor: Jan Willem van Egmond, Charleston, WV (US)

( * ) Notice: Subject to any disclaimer, the term of this patent is extended or adjusted under 35 U.S.C. 154(b) by 0 days.

(21) Appl. No.: 17/721,662

(22) Filed: Apr. 15, 2022

(65) Prior Publication Data
US 2022/0242037 A1    Aug. 4, 2022

Related U.S. Application Data

(62) Division of application No. 16/353,939, filed on Mar. 14, 2019, now Pat. No. 11,305,485.
(Continued)

(51) Int. Cl.
*B29C 64/00*   (2017.01)
*B29C 64/153*  (2017.01)
(Continued)

(52) U.S. Cl.
CPC ...... *B29C 64/153* (2017.08); *B01D 67/00045* (2022.08); *B01D 67/00415* (2022.08); *B22F 10/00* (2021.01); *B22F 10/28* (2021.01); *B22F 10/37* (2021.01); *B22F 10/38* (2021.01); *B22F 10/85* (2021.01); *B22F 12/00* (2021.01); *B22F 12/82* (2021.01); *B22F 12/90* (2021.01); *B29C 64/00* (2017.08); *B29C 64/10* (2017.08); *B29C 64/176* (2017.08); *B29C 64/182* (2017.08); *B29C 64/20* (2017.08); *B29C 64/205* (2017.08); *B29C 64/227* (2017.08); *B29C 64/232* (2017.08); *B29C 64/245* (2017.08);
(Continued)

(58) Field of Classification Search
CPC .............................. B29C 64/153; B33Y 40/00
See application file for complete search history.

(56) References Cited

U.S. PATENT DOCUMENTS 4,818,562 A * 4/1989 Amelia ................... B22F 12/49
                                                   118/DIG. 5
5,017,317 A    5/1991 Marcus
(Continued)

OTHER PUBLICATIONS

The International Searching Authority, Notification Concerning Transmittal of International Preliminary Report on Patentability dated Sep. 24, 2022, in International Application No. PCT/US2019/022335, seven pages.
(Continued)

*Primary Examiner* — Nicholas R Krasnow
(74) *Attorney, Agent, or Firm* — Dickinson Wright PLLC

(57) ABSTRACT

A system, method and apparatus for additive manufacturing is disclosed. The method includes fluidizing particles with a medium to form a fluidized bed and additively manufacturing an article formed from the particles. The article has an open porous structure defining a plurality of pores and a plurality of fluid paths through the article. The method further includes flowing the particles and the medium through the fluid paths while the fluid paths are being formed. The article may be additively manufactured by selectively sintering the particles at target areas on the article which are near the surface of the fluidized bed.

21 Claims, 17 Drawing Sheets

Related U.S. Application Data

(60) Provisional application No. 62/643,632, filed on Mar. 15, 2018.

(51) Int. Cl.

| | | |
|---|---|---|
| *B29C 64/232* | (2017.01) | |
| *B29C 64/245* | (2017.01) | |
| *B29C 64/295* | (2017.01) | |
| *B29C 64/268* | (2017.01) | |
| *B33Y 40/20* | (2020.01) | |
| *B33Y 40/00* | (2020.01) | |
| *B22F 10/28* | (2021.01) | |
| *B22F 12/90* | (2021.01) | |
| *B22F 10/37* | (2021.01) | |
| *B22F 10/38* | (2021.01) | |
| *B22F 10/85* | (2021.01) | |
| *B33Y 70/00* | (2020.01) | |
| *B33Y 50/00* | (2015.01) | |
| *B22F 12/00* | (2021.01) | |
| *B29C 64/30* | (2017.01) | |
| *B29C 64/10* | (2017.01) | |
| *B29C 64/25* | (2017.01) | |
| *B29C 64/386* | (2017.01) | |
| *B29C 64/393* | (2017.01) | |
| *B22F 10/00* | (2021.01) | |
| *B33Y 80/00* | (2015.01) | |
| *B29C 64/20* | (2017.01) | |
| *B29C 64/176* | (2017.01) | |
| *B33Y 50/02* | (2015.01) | |
| *B29C 64/40* | (2017.01) | |
| *B33Y 99/00* | (2015.01) | |
| *B29C 64/307* | (2017.01) | |
| *B22F 12/82* | (2021.01) | |
| *B29C 64/182* | (2017.01) | |
| *B33Y 40/10* | (2020.01) | |
| *B29C 64/255* | (2017.01) | |
| *B29C 64/205* | (2017.01) | |
| *B29C 64/227* | (2017.01) | |
| *B01D 67/00* | (2006.01) | |
| *B33Y 10/00* | (2015.01) | |
| *B33Y 30/00* | (2015.01) | |
| *B22F 12/17* | (2021.01) | |
| *B22F 12/20* | (2021.01) | |
| *B22F 12/30* | (2021.01) | |
| *B22F 12/44* | (2021.01) | |
| *B22F 12/70* | (2021.01) | |

(52) U.S. Cl.
CPC ............ *B29C 64/25* (2017.08); *B29C 64/255* (2017.08); *B29C 64/268* (2017.08); *B29C 64/295* (2017.08); *B29C 64/30* (2017.08); *B29C 64/307* (2017.08); *B29C 64/386* (2017.08); *B29C 64/393* (2017.08); *B29C 64/40* (2017.08); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *B22F 12/17* (2021.01); *B22F 12/20* (2021.01); *B22F 12/30* (2021.01); *B22F 12/44* (2021.01); *B22F 12/70* (2021.01); *B33Y 10/00* (2014.12); *B33Y 30/00* (2014.12); *G03G 2215/2054* (2013.01); *G05B 2219/49023* (2013.01); *G05B 2219/49246* (2013.01); *Y10T 156/1722* (2015.01); *Y10T 156/1798* (2015.01)

(56) References Cited

U.S. PATENT DOCUMENTS

| | | |
|---|---|---|
| 5,135,695 A | 8/1992 | Marcus |
| 10,029,417 B2 | 7/2018 | James et al. |
| 2015/0125335 A1 | 5/2015 | Bruck et al. |
| 2015/0258744 A1 | 9/2015 | Muller et al. |
| 2016/0067923 A1 | 3/2016 | James et al. |
| 2017/0165866 A1 | 6/2017 | Gunster et al. |
| 2017/0173892 A1 | 6/2017 | Steele |
| 2017/0184108 A1* | 6/2017 | Scancarello ........... B33Y 10/00 |
| 2017/0304894 A1* | 10/2017 | Buller ..................... B22F 12/45 |
| 2018/0079029 A1* | 3/2018 | Scott .................... B23K 26/703 |

OTHER PUBLICATIONS

Lu et al., "A Review on Supercritical Fluidization", Thermal Power Plants—New Trends and Recent Developments, 2018, IntechOpen, 20 pages.

* cited by examiner

Non-Optimization

Surface Optimization

SYSTEM, METHOD AND APPARATUS FOR FLUIDIZED BED ADDITIVE MANUFACTURING

CROSS-REFERENCE TO RELATED APPLICATION

This application is a continuation of U.S. patent application Ser. No. 16/353,939, filed Mar. 14, 2019, which claims the benefit of U.S. Provisional Application No. 62/643,632, filed on Mar. 15, 2018. The contents of the above-referenced applications are incorporated herein by references in their entirety.

FIELD OF THE DISCLOSURE

The present disclosure generally relates to additive manufacturing and, in particular, to a system and a method that uses a selectively directed energy beam to sinter powder in a pattern to fabricate an article.

BACKGROUND OF THE DISCLOSURE

Additive Manufacturing has enormous potential for improving the way articles are made. Of the different additive manufacturing production methods available, laser sintering of powder is considered as one of the most promising of these methods. Laser sintering is a process based on dispensing powder from a hopper, spreading the powder in a smooth layer using a roller and then selectively irradiating the powdered material. As a result of the irradiation, the polymer particle partially melts or melts the surface of the particle. The particles then sinter by adhering to each other coalescing and solidifying thus producing the desired shape of the layer of powder irradiated. The pattern of sintered powder in each layer corresponds to a slice of the article being fabricated. This layer-by-layer process continues by sintering each subsequently applied layer. Repetition of the above steps results in the formation of a laser-sintered article lying in a bed of unused powder. The completed article is then dug out of the powder bed and dusted off. In this way the process can produce complicated three dimensional articles and is suitable for low volume production of high value articles.

Although the laser sintering technology described above is well suited for making low volume, high value articles with a complex shape, there are a number of limitations that prevents this technology from being suitable for high volume production of articles:

The types of powder are limited to those with good flowability such that the roller can lay down a smooth layer. Generally only a few formulations such as, polyamide 11 and polyamide 12, are available. Suitable powder formulations are not only very limited, but also more expensive by at least an order of magnitude than commodity plastics. A larger range of cheaper powders is needed.

The amount by which the powder can be preheated is limited by a caking temperature above which the powder starts to clump and the roller cannot lay down a smooth layer.

Fabrication speed is an issue and is limited by including a step to lay down powder with the roller.

Good temperature control of the most recent layers fabricated is difficult in a quiescent powder bed. Poor temperature control can lead to deformation of the article or curling up of layers at edges and corners.

Heat removal from the fabrication process is inefficient in a quiescent powder bed. The amount of heat supplied by the laser or lasers can limit the speed of fabrication.

It is difficult to fabricate articles with a gradient in composition.

It is cumbersome to remove the completed article from the bed of unused powder.

SUMMARY OF THE DISCLOSURE

In general terms, the present disclosure can include a system, method, and apparatus that comprises fluidizing a bed of powder and using a directed energy beam to join (e.g., sinter) the particles of the powder in selected target areas. The target areas can be at or near the surface of a structure being fabricated. The pattern of the target areas can correspond to a cross-sectional slice of the model of the article being fabricated. Sintering particles in a pre-determined pattern fabricates portions of the structure being fabricated. Embodiments of the structure are designed to have an open porous structure. The porosity of the structure is sufficiently open so as to allow movement of the particles of the fluidized bed through the pores and to the build surface.

Embodiments can use the principle of powder fluidization to deposit powder at the build surface of a structure being fabricated by additive manufacturing. Fluidization is a process whereby a granular powder material is converted from a solid-like state to a fluid-like state. Fluidization can be achieved by passing a fluid (e.g., gas, liquid or supercritical fluid) up through a powder bed. This is generally done in a vessel with a distributor plate. The powder is above the distributor plate and the fluidizing medium is forced up through the distributor plate and through the powder bed. For the powder to be fluidized, the fluid velocity is high enough that the drag forces on the particles of the powder overcome gravitational forces, causing the particles to become suspended and collide with each other. If the particles are small enough, and the velocity is not so high as to form bubbles, then the bed expands smoothly in a homogeneous manner, with the top surface being well defined. When a powder bed of solid particles is thus fluidized it exhibits liquid-like behavior. For example a fluidized bed of powder can fill the volume of a chamber like a liquid so that the surface of the fluidized bed is more or less flat and perpendicular to gravity. Objects can be immersed in a fluidized bed. The liquid-like behavior of a fluidized bed causes objects with higher density than the fluidized bed density to sink. Also, fluidized powder can be transported, for example channeled through pipes. Further, the height of the surface of two connected fluidized bed vessels will tend to equalize. A wide variety of powder types are suitable for fluidization. The particles of the powder can have a wide range of compositions, different shapes, sizes and size distributions. Fluidized beds are also known to provide excellent heat transfer.

In current laser sintering machines, the powder is dispensed layer-by-layer by a roller to form a quiescent powder bed on top of the build surface of the article being fabricated. In contrast, embodiments of this disclosure can supply powder to the build surface(s) through pores in the open porous structure of the article being fabricated. Therefore, in general terms, this can be an "inside-out" or "exoskeleton" method for building up an article by using building material supplied from or through the inside of the article. The article being fabricated can be started on a build substrate that is held in place in the fluidized bed. In some versions, the build substrate is more or less horizontal and is porous with holes over at least the region where the fabrication of the base of the article is to start. The holes can be large enough and sufficient in distribution that the fluidized bed can pass through the holes of the substrate. At the start of the fabrication the substrate can be immersed slightly below the surface of the fluidized bed and selectively irradiated with a directed energy beam, such as a laser, so as to sinter the particles of the fluidized bed to the surface of the substrate in selected target areas. The target areas where the laser scans can be determined from a slice taken of a three-dimensional model of the structure in the computer or from a mathematical description of the structure of the article. There are several embodiments of the method to fabricate the porous structure using a fluidized bed to dispense powder. In one embodiment, as the structure is built up with sintered particles, it is submerged into the fluidized bed so that recently built portions of the structure are slightly below the surface of the fluidized bed. In another embodiment, the build substrate or build surface is raised above the fluidized bed, selectively irradiated so as to become tacky or molten at the target areas on the build surface and then submerged into the fluidized bed so as to pick up fresh particles. As well as lowering the structure being fabricated into the fluidized bed, the fluidized bed can be raised by various means. The type of structure fabricated can be sufficiently open and porous so as to allow the fluidizing medium and particles of the fluidized powder to be transported through the structure being fabricated. Because of this open porosity property, fresh powder can continue to be transported to the build surface by the fluidizing medium that flows through the porous structure.

A computerized model of the article can be used to direct the energy beam selectively to the target areas of the build surface corresponding to the cross section of the structure being fabricated. For example the boundary of the target area can be made up of scans of the laser focal point and the middle filled in by a raster scan. Alternatively a single point of the laser focal point can be used for the build surface corresponding to the cross-section of a structural element such as a strut. A computerized means can be used to control the height of the fluidized bed surface and the height of the structure relative to the fluidized bed vessel. A computer can control operations including fluidizing the bed, circulating the fluidizing medium, supplying powder to the fluidized bed and controlling temperatures, temperatures and flows.

Fluidized beds are excellent mediums for heat transfer, and this property can be used to control the temperature of the powder being brought to the build surface and to moderate the temperature of freshly built portions of the structure. The temperature of the fluidized bed can be controlled so that the powder is close to but below the temperature at which particles become tacky and stick to each other. By controlling the temperature, less energy needs to be supplied to the build surface to heat the particles. By being immersed in the fluidized bed, temperature gradients in the freshly built structure can be moderated, which can help to prevent geometric distortion of the structure. The upward flow of the fluidizing medium efficiently removes heat supplied by the energy beam to the build surface during the sintering process. The heated fluidizing medium can be removed from the top of the fluidization vessel and then can be cooled by a heat exchanger. The cooled fluidization medium stream can then be circulated back through the bottom of the fluidized bed vessel by a pump or a compressor. With efficient heat removal and good control of the temperature of the particles and structure being fabricated and the vessel as a whole, faster build times than existing solutions are possible.

During the sintering process, volatile by-products can be produced. The volatiles thus produced are carried away by the fluidizing medium, out of the fluidization vessel and to other areas of the process where a portion of the impurities can be removed by a separation unit. After the purification step, the fluidizing medium can be circulated back to the fluidized bed.

This disclosure is not limited to a particular type of powder, but is adaptable to many powder types that are fluidizable. These materials can include plastic, metal, polymer, ceramic powders, powders of composite particles or a mixture of such powders. Powders with a wide range of particle shapes, sizes and size distributions can be fluidized and used.

The composition of the powder in the fluidized bed can be varied at a specific rate by removing powder and adding powder of a different type to the fluidized bed and thus changing the composition of the fluidized bed at a specific rate. By doing so, the composition of the article being fabricated can be varied with a specific gradient.

The porosity of the structure can take many forms and can be designed so as to allow the easy, generally upward flow of the fluidizing medium and fluidized particles through the pores. All of the pores can be interconnected and can have regular or irregular structure. When the porous structure is immersed in the fluidized bed, the liquid-like properties of the fluidized bed allows it to fill the pores. Wall effects from the pore walls may tend to hinder fluidization, but these effects can be reduced by using larger pore sizes or changing the pore type, orientation or shape. For example, a porous structure with minimal walls can be composed of a three dimensional honeycomb network of struts interconnected at nodes. Each strut can be fabricated by the method of selective irradiation and particles sintering to the build surface. During fabrication of such a structure, the target areas of the build surface represent horizontal slices of a strut or node. The open porous structure can be designed to impart specific properties to the fabricated article. For example, the method can manufacture article with an open porous structure that is light weight and has a high stiffness-to-weight ratio.

In a conventional laser sintering process where powder is dispensed by roller, the powder is sintered together layer-by-layer until the completed part is formed. In contrast, embodiments of the disclosure can utilize both layer-by-layer and continuous methods. In the continuous method, portions of the structure can be built up continuously when particles from the fluidized bed are allowed to continuously deposit at build surfaces irradiated by the directed energy beam.

In some embodiments, the fabrication process of the porous structure can be continued so as to describe the volume of the intended article. When the article is completed, the article can be raised out of the fluidized bed by a lift mechanism, and/or the fluidized bed can be partially drained to a holding vessel so that the fluidized bed surface is below the base of the article or the build substrate. A number of useful processes can be performed at the end of the fabrication process, including heating and quenching at specific rates or reacting with a reactive gas. The vessel can then be cooled, isolated, purged and opened and the article can be removed from the vessel through a hatch.

The cost per part manufactured by the system and method above can be reduced by increasing the number of fluidized bed additive manufacturing units at a factory. In an embodiment, much of the equipment associated with recycling, heating, cooling, cleaning and pressurizing the fluidizing medium and much of the equipment associated with heating and supplying the powder to the fluidized bed is shared by an array of a large number of fluidized bed additive manufacturing units.

As can be appreciated from the above general description, the method and system reduces many of the limitations associated with fabrication of articles by methods that use a roller. The "inside out" method of feeding the fresh powder to the build surface has several advantages over the method of depositing powder layer-by-layer with a roller. Various aspects of my fluidized bed additive manufacturing system and method may have one or more of the following advantages:

- A broad range of particle types, compositions, shapes and size distributions can be used.
- The efficient heat transfer in a fluidized bed allows the temperature of the fluidized powder to be controlled and temperature gradients in the fabricated structure to be moderated. This can help reduce curling and geometric distortion.
- The upward flow of the fluidizing medium carries away heat from the sintering process and out of the fluidizing vessel and can help increase build speed when they would otherwise be limited by cooling.
- Powder can be transported to the build surface, without the use of a roller. Eliminating the roller step means that build times are potentially reduced.
- Articles with specific gradient properties in their structure can be produced by changing the composition of the powder in the fluidized bed at a specific rate.
- After the fabrication is completed, the article does not need to be dug out of a static powder bed. The unused powder can be removed by lowering the height of the fluidized bed surface below that of the base of the article. This can help reduce turnover times.
- If a gas is used as the fluidization medium, the ease of fluidization or heat removal can be improved, by pressurizing the gas and so increasing the gas density and heat capacity. A supercritical fluid such as supercritical $CO_2$ can be used. Metal powders have high density and that can make them difficult to fluidize smoothly. For this reason a liquid or supercritical fluid may be useful as fluidizing medium for metal powders.
- The upward flow of the fluidizing medium helps to remove volatiles that can be produced during the sintering process.
- Equipment can be shared by multiple fluidized bed additive manufacturing units in an array of fluidized beds.

BRIEF DESCRIPTION OF THE DRAWINGS

The drawings illustrate some of the embodiments of the system, method and apparatus.

DETAILED DESCRIPTION

Embodiments of a system and a method of forming an article having a porous three dimensional structure using additive manufacturing are disclosed. The system can use selective laser scanning technology to sinter powder at a build surface. The powder is admitted to the build surface by a fluidized bed. In some versions, the powder at the build surface is selectively sintered to fabricate a portion of a porous structure. The porous structure thus fabricated is the core of the article being built. A skin can be attached to the porous core structure to make the surface continuous instead of porous.

Figure 1:
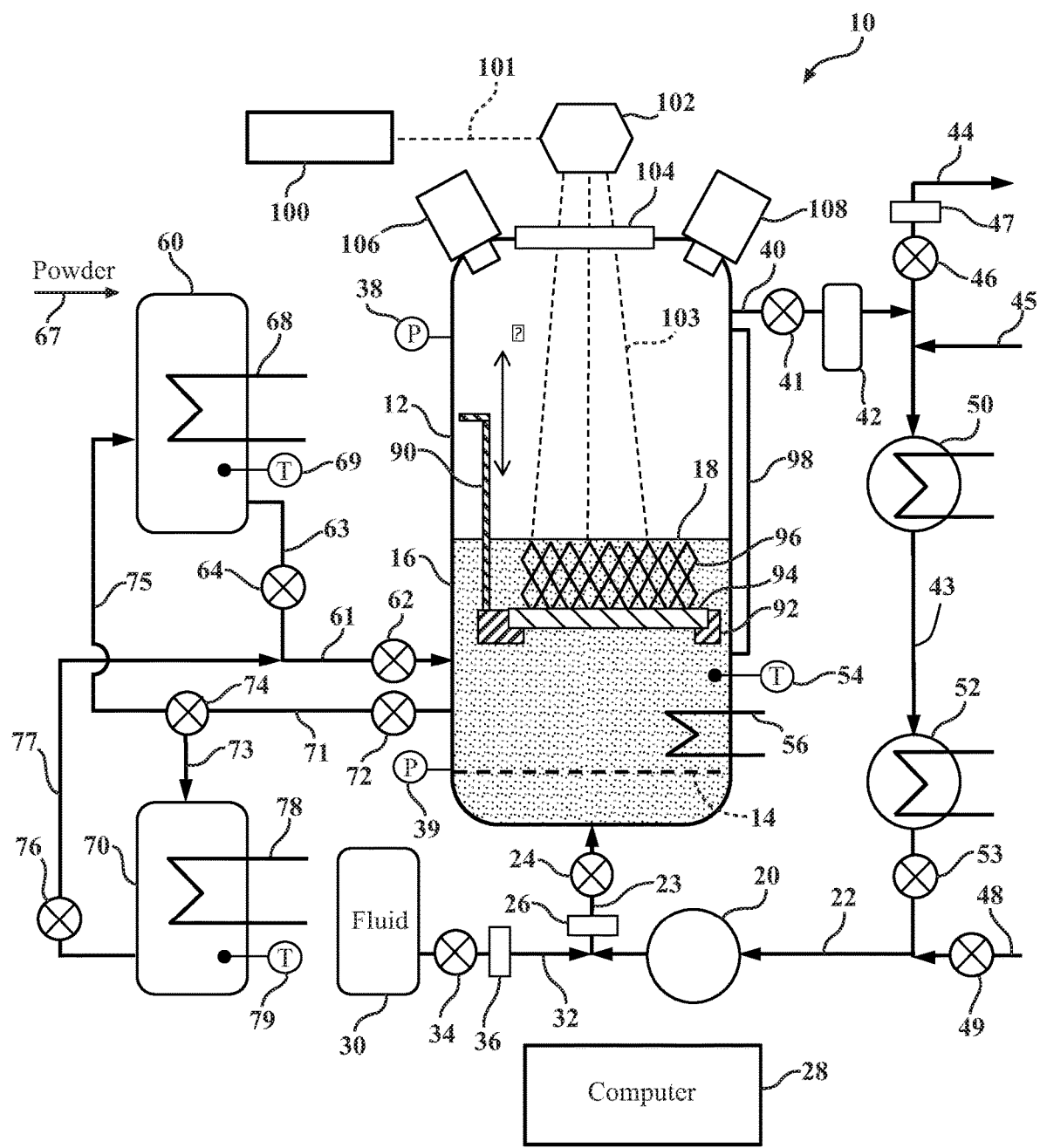
FIG. 1 depicts a schematic view of an example of the fluidized bed additive manufacturing system.

FIG. 1 provides a schematic view of an embodiment of the fluidized bed additive manufacturing (FBAM) system 10. The system 10 comprises a primary vessel 12 that is impermeable fluids and may be insulated. The primary vessel 12 has a top and bottom being vertically spaced and may have a window 104 at the top. The primary vessel 12 defines a chamber and may have hatch 98 which can be opened to provide access to the chamber for inserting and removing articles 96 and cleaning. The hatch 98 is closed during manufacturing. A distributor plate 14 is disposed near the bottom of the primary vessel 12 and may be attached to the primary vessel 12. The distributor plate 14 extends horizontally across the chamber and has a plurality of holes which may be distributed evenly across the distributor plate 14. The distributor plate 14 can be a perforated plate or a porous diffusor or other suitable choices that are available.

Embodiments of a fluidized bed 16 can be disposed in the chamber above the distributor plate 14 and extends vertically from the distributor plate 14 to a surface 18. The fluidized bed 16 is dynamic and may contain peaks and troughs. Herein, the surface 18 is referring to a horizontal line below which something would be submerged in the fluidized bed 16. The fluidized bed 16 can include particles and a medium having a superficial velocity u that is greater than the minimum fluidizing superficial velocity $u_{mf}$ for the particles but less than a minimum bubbling velocity. In some examples, the superficial velocity may be calculated by dividing the volumetric flow of the medium through the primary vessel by the cross sectional area of the primary vessel 12. The particles have an average outer dimension $d_p$ of at least about 10 microns and not greater than about 1 mm. In one embodiment, the fluidized bed may have a transparent zone that is at least partially transparent and extends a distance D below the surface 18.

In some embodiments, a lift device 90 is in the chamber and is attached to the primary vessel 12. The lift device 90 may vertically move a frame 92 attached to the lift device 90 which extends at least partially around the perimeter of the primary vessel 12 and has at least one opening 93 defined by a ledge. A substrate 94 extends across the opening 93 and is received and secured by the ledge. The substrate 94 defines perforations which are larger than $d_p$ such that particles can flow through the perforations and may be of varying size.

Embodiments can include a first camera 106 mounted adjacent to the primary vessel 12 and pointed toward the substrate 94 for visually monitoring fabrication of the article. A second camera 108 of the infrared type may be mounted adjacent to the primary vessel 12 for detecting temperature variations within the chamber. The cameras 106, 108 monitor the level of the fluidized bed 16 and the state and temperature of the build. The output of the cameras is used by a computer 28 to determine the height of the surface of the fluidized bed 16. The cameras 106, 108 can also be used to determine the height of the article 96 above the substrate 94 when it is lifted above the surface 18 of the fluidized bed 16. The first camera 106 can be used to monitor for defects in the fabrication and the second camera 108 can be used to detect temperature variations. It can be appreciated that more than two cameras and cameras of different type and resolution can be used.

Some embodiments of the system 10 can comprise an energy beam source 100 which emits an energy beam 101 (shown by a dashed line) toward optical components 102. The energy beam 101 can be a laser or an electron gun. The beam 101 can be manipulated by means of optical components 102. It can be appreciated that there are many means to manipulate laser beams 101. Beam 101 can be focused, split into multiple beams, pulsed, selectively directed in different directions, selectively masked and/or otherwise manipulated by the optical components 102. Optical components 102 comprise a prism or prisms and a mirror assembly for selecting the direction of travel of the laser beam or beams 103. It can be appreciated that there are many means of directing the aim of a laser beam, here the term aim meaning the propagation direction of the beam. The mirror assembly comprises mirrors and galvanometers coupled to the mirrors to selectively orient them. The movement of the galvanometers is controlled by the computer 28 so that the aim of the laser beam can be directed to scan in the target area on or near the surface 18 of fluidized bed 16 according to different patterns determined by a cross-section of a model of the article 96 to be fabricated. The laser beam or beams 103 may enter the fluidized bed vessel through window 104. It can be appreciated that in different embodiments, some of the optical components 102 can be placed inside primary vessel 12. Computer 28 controls the optical components 102 so as to direct the energy beam 101 at selective parts of a target at or near surface 18. The energy beam 101 may be split into a plurality of energy beams 103 and the plurality of energy beams 103 are directed through the window 104 into the chamber and toward the substrate 94.

Embodiments of a primary resistance heater 56 may be coupled to the primary vessel 12 and may extend into the chamber above the distributor plate 14 for regulating the temperature of the chamber and the fluidized bed 16. A first temperature monitoring device 54, which may a thermocouple, thermowell or any suitable temperature monitoring device, is disposed in the chamber for monitoring the temperature of the fluidized bed 16.

In some examples, a first pressure tap 38 may be coupled to the primary vessel 12 toward the top and above the fluidized bed 16 and a second pressure tap 39 may be coupled to the primary vessel 12 directly above the distributor plate 14 for monitoring the pressure and calculating the mass of particles in the fluidized bed 16 based on the difference in pressure between the pressure taps 38, 39.

Versions of the system 10 may also comprise a holding vessel 30 containing the medium. The holding vessel 30 may be fluidly connected through a first line 32 to a first valve 34 coupled to the first line 32 that controls flow from the holding vessel 30 and may be fluidly connected to a first flow meter 36 which monitors the flow of the medium from the holding vessel 30 through the first line 32 such that the medium can flow between the holding vessel 30 and the chamber.

Embodiments of the system 10 may also comprise a second line 23 which is fluidly connected to the first line 32 and to a second flow meter 26 attached to the second line 23 for monitoring the flow into the chamber and which is coupled to a second valve 24. The second valve 24 is coupled to the second line 23 which controls flow into the chamber.

In one example, the system 10 may also comprise a third line 40 which is fluidly connected to the chamber and to a third valve 41 coupled to the third line 40 for controlling flow of the medium and the particles out of the chamber. The third line 40 may be coupled to a third flow meter for monitoring flow out of the chamber. The third line 40 may also be coupled to a unit 42 for separating particles from the medium.

In some versions, the system 10 may also comprise a recycle line 43 coupled to a first cooling device 50 for cooling the medium in the recycle line 43. The cooling device may be a heat exchanger. The recycle line 43 may also be coupled to a second heat exchanger 52 for heating the medium in recycle line 43 and may be coupled a recycle-valve 53 for controlling flow out of the recycle line 43. The recycle line 43 may also be fluidly connected to a fourth line 45 for adding medium to the recycle line 43.

Other versions of the system 10 may also comprise a fifth line 48 coupled to a fourth valve 49 and to a reservoir of purge fluid used to purge the primary vessel 12 when the fourth valve 49 and the second valve 24 are open and the recycle-valve 53 valve is closed.

Another example of the system 10 may also comprise a sixth line 22 for receiving the medium from the fifth line 48 and the recycle line 43. The sixth line 22 may be fluidly connected to a pump or compressor 20.

Still another embodiment of the system 10 may also comprise a seventh line 44 which may receive flow from the third line 40 for purification in a separation unit followed by releasing the medium to the atmosphere. The seventh line 44 may be coupled to a seventh valve 46 for controlling flow through the seventh line 44 and to a seventh flow meter 47.

Versions of the system 10 may also comprise a salvage vessel 70 containing additives and particles and the medium. The particles in the salvage vessel 70 may be fluidized. The salvage vessel 70 may be fluidly connected to an eighth line 77, to an eighth valve 76 coupled to the eighth line 77, to a ninth line 61, to a ninth valve 62 coupled to the ninth line 62, and to the chamber such that particles and the medium can be conveyed from the salvage vessel 70 through the eighth line 77, the eighth valve 76, the ninth line 61, and the ninth valve 62 to the chamber. The system 10 may also comprise a fourth heat exchanger 78 coupled to the salvage vessel 70 for heating particles and the medium inside the salvage vessel 70. A second temperature monitoring device 79 may be coupled to and extending into the salvage vessel 70 for monitoring the temperature inside the salvage vessel 70.

Examples of the system 10 may also comprise a storage vessel 60 containing some of additives and some the particles. The storage vessel 60 may be fluidly connected to a tenth line 63, a tenth valve 64 coupled to the tenth line 63, the ninth line 61, the ninth valve 62 and the chamber such that particles and the medium may be conveyed from the storage vessel 60 through the tenth line 63, the tenth valve 64, the ninth line 61, and the ninth valve 62 to the chamber. The system 10 may also comprise a storage heating device 68 attached to and extending into the storage vessel 60 for heating particles inside the storage vessel 60. The system 10 may also comprise a third temperature monitoring device 69 coupled to the storage vessel 60 for monitoring the temperature inside the storage vessel 60.

Other versions of the system 10 may also comprise an eleventh line 71 which is fluidly connected to the chamber and coupled to an eleventh valve 72 and a twelfth valve 74 of the three-way type. The twelfth valve 74 may be coupled to a twelfth line 73 which may be fluidly connected to the salvage vessel 70 such that medium and particles may be conveyed from the chamber, through the eleventh line 71, the eleventh valve 72, the twelfth valve 74 and the twelfth line 73 to the salvage vessel 70.

Embodiments of the system 10 may also comprise a thirteenth line 75 coupled to a twelfth valve 74 which may be fluidly connected to the storage vessel 60 such that the medium and some of the particles may be conveyed from the chamber through twelfth valve 74 and the thirteenth line 75 to the storage vessel 60.

In one example, the system 10 may also comprise a fourteenth line 67 fluidly connected to the storage vessel 60 for conveying particles to the storage vessel 60.

Versions of the aforementioned system 10 may be used to perform the method of fluidized bed additive manufacturing. The particles in the primary vessel 12 may be fluidized by means of a medium (liquid, gas or supercritical fluid) that passes up through the distributor plate 14. Pump or compressor 20 forces the fluidization medium through lines 22, 23 into the base of the primary vessel 12. The flow of the medium into the primary vessel 12 may be controlled by opening and closing the second valve 24. The second flow meter 26 monitors the flow through the second line 23. The second valve 24 and second flow meter 26 are connected to computer 28, which can control the flow through the second line 23 by opening or closing the second valve 24. Fresh medium can be admitted from the holding vessel 30 through first line 32. The flow of the medium can be controlled by computer 28 by opening or closing the first valve 34 and monitoring the flow using the first flow meter 36. The medium in the primary vessel 12 can be pressurized if it is a gas or converted to a supercritical fluid. The medium becomes a supercritical medium when the temperature and pressure in the primary vessel 12 are adjusted to be greater than the critical temperature and critical pressure, respectively, of the medium. The medium may also be near critical. Supercritical and near supercritical fluids may be advantageous due to their high heat capacities. The pressure in the primary vessel 12 may be monitored using the first pressure taps 38 located high up in the primary vessel 12, above the surface 18 of the fluidized bed 16. The second pressure tap 39 is located low in the fluidized bed 16 slightly above the level of the distributor plate 14. The difference in pressure between pressure taps 38 and 39 can be used to determine the mass of particles in the fluidized bed.

In some embodiments, the medium flows out of the primary vessel 12 through third line 40. Particles entrained in the medium flowing out of the primary vessel 12 can be removed by the unit 42. The unit 42 may be a trap, a filter or a cyclone. All or part of the medium can be circulated back to the fluidized bed 16 by lines 43, 22 and 23 or can be sent through the seventh line 44 to be purified in a separation unit, collected, released to atmosphere or sent to an atmospheric flare. Purified medium can be returned to the recycle line 43 through the fourth line 45. The flow of medium through the seventh line 44 can be controlled by opening and closing the seventh valve 46 with the flow measured by the seventh flow meter 47. The fifth line 48 allows a purge fluid to enter the system 10 when the fourth valve 49 is opened. The recirculating medium in the recycle line 43 can be cooled by the first heat exchanger 50 and heated by the second heat exchanger 52. Heating may be needed prior to the start of the fabrication to raise the temperature of the fluidized bed but below the sticky temperature at which particles adhere to each other. Cooling of the recirculating medium may be needed to remove heat supplied to the primary vessel 12 by the energy beam. As can be appreciated there are different embodiments of the lay-outs of the different streams and units such as heat exchangers, storage vessels, valves, lines and compressors of the system that would work. The layout in FIG. 1 is one example.

It can be appreciated that appropriate outputs from different components of the layout can be fed back to computer 28, and that the computer can take appropriate actions according to well established control practices by sending signals to open or close valves, or to control a heating unit or compressor or other such actions with other types of units. Therefore specific connections between computer 28 and the other units in FIG. 1 are very prolific but are not shown because these connections would render the drawing difficult to read.

The temperature of the fluidized bed 16 can be monitored by thermocouple or thermowell 54 connected to computer 28. An amount of heat can be supplied by the second heat exchanger 52 to heat the recirculating medium in the recycle line 43 and an amount of heat can be removed from the recirculating medium in the recycle line 43 by the first heat exchanger 50. The amount of heating and cooling is adjusted by computer 28 to achieve a desired temperature in the fluidized bed. The fluidized bed temperature can be adjusted further by using heat exchanger or a resistance heater 56 in the fluidized bed 16. A pressurized gas can be used as the medium in the system 10 and the method. Pressurizing the gas increases the heat capacity of the gas and therefore allows for more heat removal from the fluidized bed. A higher density gas can also make the fluidized bed 16 more expandable when the fluidizing velocity is increased. Especially if the particles have high density such as with metal particles, then it may be advantageous to use a supercritical medium or a liquid as the medium.

In some embodiments, particles are held in the storage vessel 60 and can be conveyed through the ninth line 61 and the tenth line 63 to the primary vessel 12. The flow of particles can be controlled by computer 28 by opening or closing valves 62 and 64. It can be appreciated that there is a wide range of equipment options available for conveying particles, including but not limited to pneumatic conveying and gravity assisted conveying. The particles in the storage vessel 60 can be heated by the storage heating device 68 which comprises an electrical resistance heater, a heat exchanger or other heating device. The third temperature monitoring device 69 is connected to the computer which controls the amount of heat supplied to storage vessel 60 so that the temperature of the particles in storage vessel 60 can be controlled. The third temperature monitoring device 69 may be a thermocouple, thermowell or any other suitable temperature monitoring device. The particles in the storage vessel 60 can be in a fluidized bed, in which case, the line supplying the fluidizing medium is not shown in the figure. Fresh particles fed through fourteenth line 67 are used to replenish the particles in the storage vessel 60.

In addition, particles can be removed from the primary vessel 12 to the salvage vessel 70 through eleventh line 71 by opening the eleventh valve 72 and lining up the 3-way twelfth valve 74 to the salvage vessel 70 through the twelfth line 73. Alternatively, the 3-way valve twelfth valve 74 can be lined up to feed particles back to the storage vessel 60 through thirteenth line 75. The particles in salvage vessel 70 can be heated by the fourth heating device 78 which comprises an electrical resistance heater, a heat exchanger or other heating device. The second temperature monitoring device 79, which may be a thermocouple, thermowell or suitable temperature monitoring device, is connected to the computer which controls amount of heat supplied to the salvage vessel 70 by the fourth heating device 78 thus controlling the temperature of the particles. The particle bed in the salvage vessel 70 can be a fluidized bed. Particles can be returned to the primary vessel 12 by conveying the particles through the eighth line 77 by opening the eighth valve 76.

Versions can include a moveable lift device 90 that may be controlled by the computer 28 and can raise or lower the support frame 92 in the primary vessel 12. Support frame 92 comprises a rigid frame and supports a perforated build substrate 94. The support frame 92 is such that the fluidized bed 16 can easily pass through the opening of the frame 92. The frame 92 can be rectangular but as can be appreciated, many other geometries are suitable, including extending mostly across the vessel 12. The opening in the frame is such that the frame 92 does not block off portions of the build substrate 94 where fabrication is to start. The article 96 is fabricated on the build substrate 94. Build substrate 94 has holes or pores, can be a perforated plate and can be composed of many types materials including the same or a similar type of material as the particles. The size of the holes in the perforated plate 94 can be at least large enough to allow particles from the fluidized bed 16 to pass through easily. Therefore the holes can be at least the average particle size $d_p$ of the particles making up the fluidized particles. The number of holes can be sufficient in number and distribution such that holes are present at least in the vicinity where the fabrication is to occur. The holes may not be needed or desired in the area where no fabrication is to occur. In this embodiment the support frame is horizontal but it can take on different geometries depending on the geometry of the base of the article being fabricated. Hatch 98 in the primary vessel 12 is closed during operation of the system 10 and can be opened to remove the completed article 96 or to access, maintain or clean the interior of the primary vessel 12 or lift mechanism 90.

In some embodiments, the cameras 106, 108 can monitor the level of the fluidized bed 16 and the state and temperature of the build. The output of the cameras 106, 108 is used by the computer 28 to determine the height of the surface 18 of the fluidized bed 16. The cameras 106, 108 can also be used to determine the height of the article 96 above the build substrate 94 when it is lifted above the surface 18 of the fluidized bed 16. Visuals from the first cameras 106 can be used to monitor for defects in the fabrication and infrared information from the second camera 108 can be used to detect temperature variations. It can be appreciated that more than two cameras and cameras of different type and resolution can be used.

To operate some embodiments of the system 10, valves 24, 41 and 53 are opened and pump or compressor 20 is turned on so as to circulate medium through the primary vessel 12 and the lines 40, 43, 22 and 23. Particles are heated to a desired temperature in the storage vessel 60. Valves 62 and 64 are opened and the particles are conveyed into the primary vessel 12 where it may be fluidized by the medium forced up through the distributer plate 14. The amount of particles conveyed is sufficient such that when the particles are fluidized, the height of the surface 18 of the fluidized bed 16 is slightly greater than the height of the top of the perforated build substrate 94. The mass of particles in the fluidized bed 16 can be determined from the difference in pressure between pressure taps 38 and 39. Cameras 106 and 108 can be used to determine the height of the surface 18 of the fluidized bed 16 relative to the perforated build substrate 94. For example the cameras 106 and 108 can be used to determine when the top surface of the build substrate 94 is level with the surface 18 of the fluidized bed 16. The build substrate 94 has sufficient number and size of openings so that the fluidized bed 16 can envelope and go through the build substrate 94. The cameras 106, 108 are also used to determine the location of the holes or openings in perforated substrate 94. Lift 90 is then lowered by a small amount such that the substrate 94 is immersed in the fluidized bed 16 such that particles from the fluidized bed 16 covers the substrate 94. Laser 100 is turned on and beam 101 or beams 103 fuse the particles to substrate 94 in select locations. The target areas where the build-up of the article 96 starts are on the solid surface between the holes in the perforated surface so as not to block the openings. Computer 28 manipulates optical components 102 to direct the aim of the beam or beams 103 to selectively scan over and sinter particles at the target areas of the substrate 94. The target areas lie within a horizontal cross section of the base of the three dimensional structure 96 to be fabricated. As sintered particles builds up in the target area forming a bottom portion of structure 96, the structure increases in height, lift 90 lowers frame 92, substrate 94 and partially fabricated structure 96 so that it remains immersed slightly below surface 18 of the fluidized bed 16. The fused particles is cooled by up-flowing medium through the holes, and is positioned for additional particles to be transported by the fluidized bed 16 through the article 96 to the build surface. As the article 96 builds up and is lowered, the computer 28 changes the aim of beam or beams 103 to new target areas that correspond to the next cross-sectional slice of the article 96 to be fabricated. The beams 103 then selectively sinters particles at the new target areas. There are many methods of controlling the height of the structure being fabricated relative to the surface of the fluidized bed. One example is as follows. Computer 28 analyses images from cameras 106 and 108 to control the vertical position of lift 90 such that the surface of the article 96 is slightly below the surface of the fluidized bed 18. This can be done for example by raising the top of the article 96 above the surface 18 of the fluidized bed to correlate the top with the surface 18 of the fluidized bed with the cameras 106, 108, then lowering the article 96 by a small amount into the fluidized bed 16.

The article 96 can be designed in such a way that it is largely porous and that the pores are continuous and connect to the openings in the perforated plate. The pores can also be interconnected and has an open porosity such that the pores are large enough relative to the particles that they can enter and be transported through the pores by the action of the fluidizing medium.

The porosity of the article 96 is the fraction of void space in the article. The void space is defined by the plurality of pores. The volume fraction of solid material in the article 96 is the density p of the article 96 divided by the bulk density $\rho_s$ of the solid material used to manufacture the article 96. The porosity is one minus the volume fraction of solid material, as shown below.

$$\varphi = 1 - \rho/\rho_s$$

In some embodiments, the porosity is greater than 50%. In some embodiments, the porosity is greater than 90%, 99%, 99.9% and 99.99%. The porosity affects various properties of the article 96 such as the specific stiffness (stiffness to density ratio). For example, a lightweight article 96 with high specific stiffness would also have high porosity. Near solid articles 96 have low porosity such as 50% to 90%.

There are several benefits of these embodiments including that the fluidized bed 16 transports particles to the build surface through the pores. The fluidized bed 16 regulates the temperature of the newly built part of the article 96. The fluidized bed 16 also provides buoyancy and so supports fragile members of the article 96 as long as the action of the fluidized bed 16 is not too vigorous. Additionally, the medium from the fluidized bed 16 can carry away volatiles from the sintering process.

The method may manufacture articles 96 that have high stiffness to density ratios. For lightweight porous material, the stiffness decreases with decreasing density p of the material. Young's modulus (E) is a measure of stiffness. $E_s$ is the Young's modulus of the solid material. Lightweight materials such as foams and aerogels that are stochastic are known to decreases according to the below relationship.

$$E/E_s \sim (\rho/\rho_s)^3$$

As shown by the below relationship, the method may manufacture articles 96 with a stiffness greater than stochastic materials.

$$E/E_s > \varphi/\rho_s)^3$$

In some embodiments the stiffness of the article 96 follows the below relationship. For example, the specific stiffness, $E/\square$, of a titanium article 96 which has an $E_s$ of 112.5 GPa and a bulk density $\rho_s$ of 4500 kg/m³ may be equal to or below $25 \times 10^6$ m²/s².

$$E/\square \leq E_s/\rho_s$$

In some embodiments, the stiffness of the article 96 follows the below relationship.

$$E/\square \geq (\rho/\rho)^2 E_s/\rho_s$$

For example, the specific stiffness of a polystyrene article 96 which has a porosity φ of 0.9, an $E_s$ of 3.2. GPa and a bulk density $\rho_s$ of 1000 kg/m3 may be between $3.2 \times 10^6$ m²/s² and $0.032 \times 10^6$ m²/s².

$$\text{Polystyrene: } 3.2 \times 10^6 \text{ m}^2/\text{s}^2 < E/\rho < 0.032 \times 10^6 \text{ m}^2/\text{s}^2$$

In addition to raising or lowering the lift 90, the surface 18 may be raised or lowered by many methods. Examples of such methods include raising the surface 18 through bed expansion by increasing the flow of fluidizing medium through the second line 23 by opening the second valve 24. An additional example may be reducing the flow of fluidizing medium into the primary vessel 12 by closing the second valve 24 to lower the surface 18. The computer 28 uses input on the level of the fluidized bed surface 18 from the cameras 106, 108 or other level detection device 110 in combination with medium flow data to determine the amount to open or close the second valve 24. The fluidized bed 16 is achieved when the superficial velocity of the medium u fulfills the following:

$$u \geq u_{mf}$$

where $u_{mf}$ is the minimum fluidization superficial velocity. The superficial velocity is also less than the bubbling velocity. A broad range of small particle sizes can meet the above criterion but generally are such that $d_p$ is greater than about 10 micron. A wide variety of particle compositions, shapes and size distributions can be used and are suitable to meet the velocity criterion above. Broadly speaking it is desirable to have an expandable bed and by the term expandable it is meant the ability to expand and contract the fluidized bed vertically by adjusting the velocity. Polymer particles with $d_p$<about 200 microns can be suitable. For metals, particle density is generally high and smaller particle sizes than 200 micron may be suitable. In addition to decreasing particle size, the fluidized bed 16 can be made more expandable by using a more dense fluidizing medium such as a pressurized gas a supercritical medium or a liquid; by decreasing the particle size of the fluidized particles; or by increasing the viscosity of the fluid.

In some examples, based on the amount of particles removed from the fluidized bed 16 by being incorporated into a portion of the article 96, the computer 28 opens the tenth valve 64 and admits more particles from the storage vessel 60 to replenish the particles in fluidized bed 16 and maintain the surface of the fluidized bed 18 above the article 96. As the fabrication process continues, the heat from the laser heats up the fluidizing medium. In order to maintain the desired temperature of the fluidized bed 16 as monitored by thermocouple 54, cooling device 50 is used to remove heat from the fluidizing medium. Heat exchanger 52 may also remove heat from the fluidizing medium.

Undesirable volatiles can be released by the sintering process. These volatiles are carried away by the fluidizing fluid. As the volatiles build up in the fluid, they can be removed by purifying a portion of the medium through the seventh line 44 by opening the seventh valve 46 to a purification unit which can include a condenser or a distillation column or suitable separation unit. Once purified, the medium can be returned through the fourth line 45.

In one version, t process of adding material to the structure being fabricated by selectively scanning and maintaining the top level of the structure slightly below that of the fluidized bed continues until fabrication of the final shape of the structure is complete.

In some embodiments, once the fabrication of the article 96 is complete, the laser 100 is turned away or off, and lift 90 is repositioned for removal of the article 96 through hatch 98. To cool the part in a controlled manner, the temperature of the fluidized bed 16 is lowered by using cooling unit 50 and monitoring temperature with thermowell 54. It may be necessary to cool the article 96 in a controlled manner to avoid geometric distortion. The valves 72, 74 are opened to remove particles to salvage vessel 70 and lower the level 18 of the fluidized bed 16 below the base of the fabricated part 96. The seventh valve 46 can be opened to vent out the system. The system can be purged by feeding purge medium through the fifth line 48 by opening the fourth valve 49 and closing the recycle-valve 53. Once the system is vented and cooled, valves 24 and 41 are closed to isolate the primary vessel 12, hatch 98 is opened and the fabricated part 96 is removed. A new build substrate 94 is attached to the support frame 92 and the hatch 98 is closed. The system is then readied for the next fabrication by opening valves 24, 41 and 53, closing the valves 49 and 46 and allowing fluidizing medium to enter the primary vessel 12 through the lines 22 and 23. Particles from the previous build in the salvage vessel 70 are conveyed to the primary vessel 12 through lines 77 and 61 and by opening valves 76 and 62.

Figure 2A:
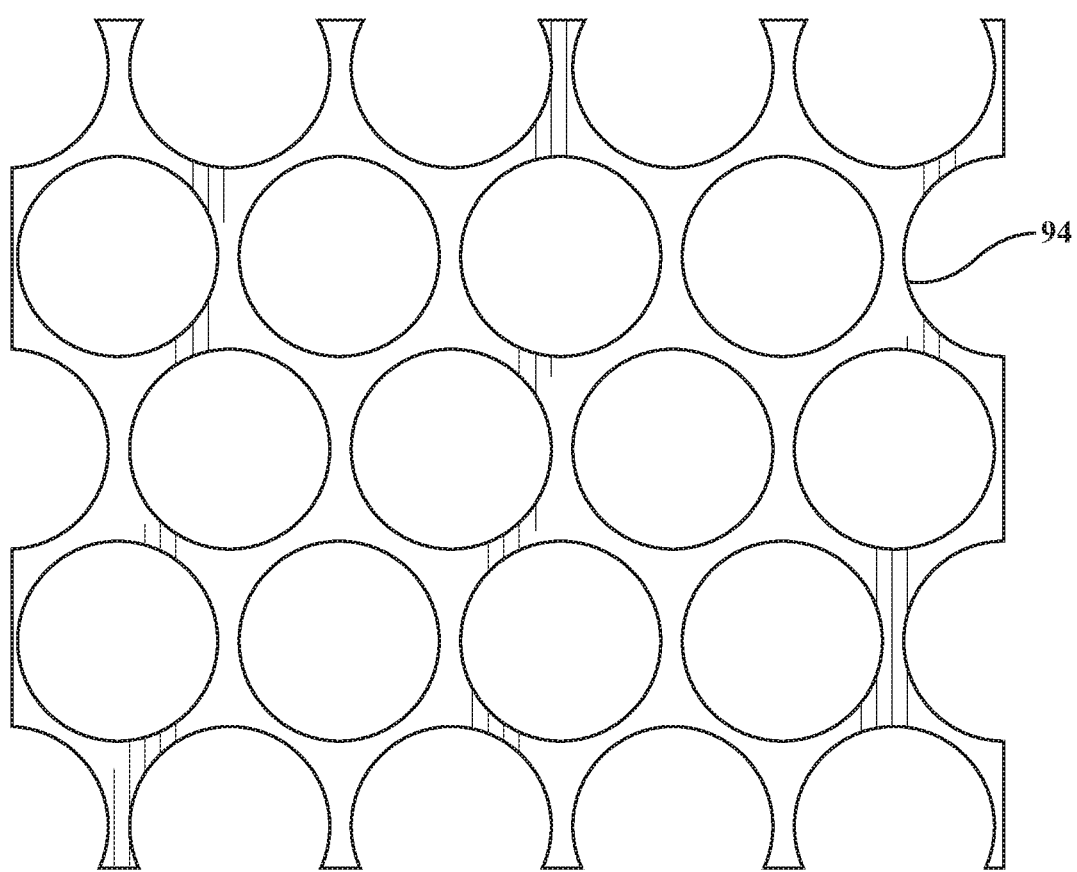
FIG. 2a-2d depict views of various stages of fabrication of an example of a porous structure on a porous support.

Turning now to examples of the fabricated article 96, FIG. 2a-2d depict various stages of the fabrication process. FIG. 2a depicts a section of the perforated build substrate 94 as seen from directly above. The direction of the medium velocity may be perpendicular to the perforated substrate 94 and can easily pass through the holes. The build substrate 94 is attached to the support frame 92 and can be raised and lowered using lift device 90 controlled by computer 28. The perforated plate 94 is lowered into the fluidized bed 16, so that a small portion of the fluidized bed 16 is above the perforated plate 94.

Figure 2B:
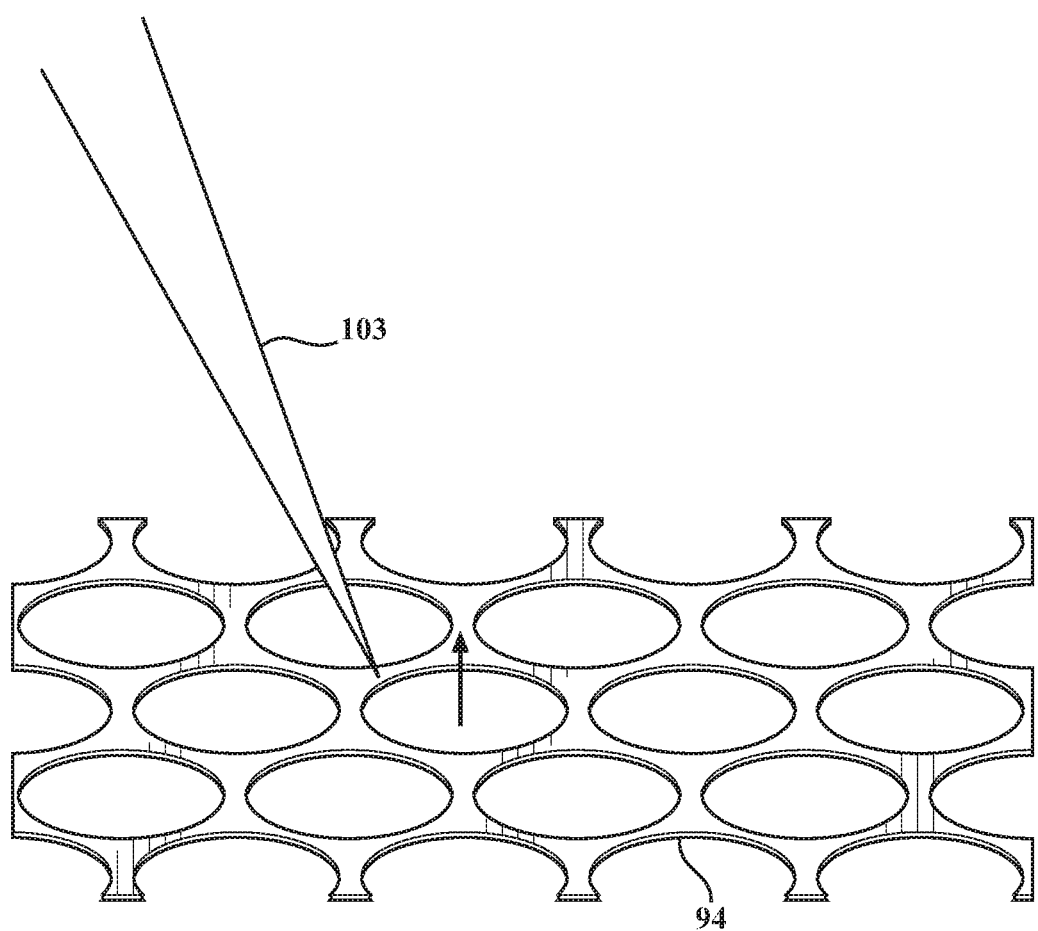
Figure 2C:
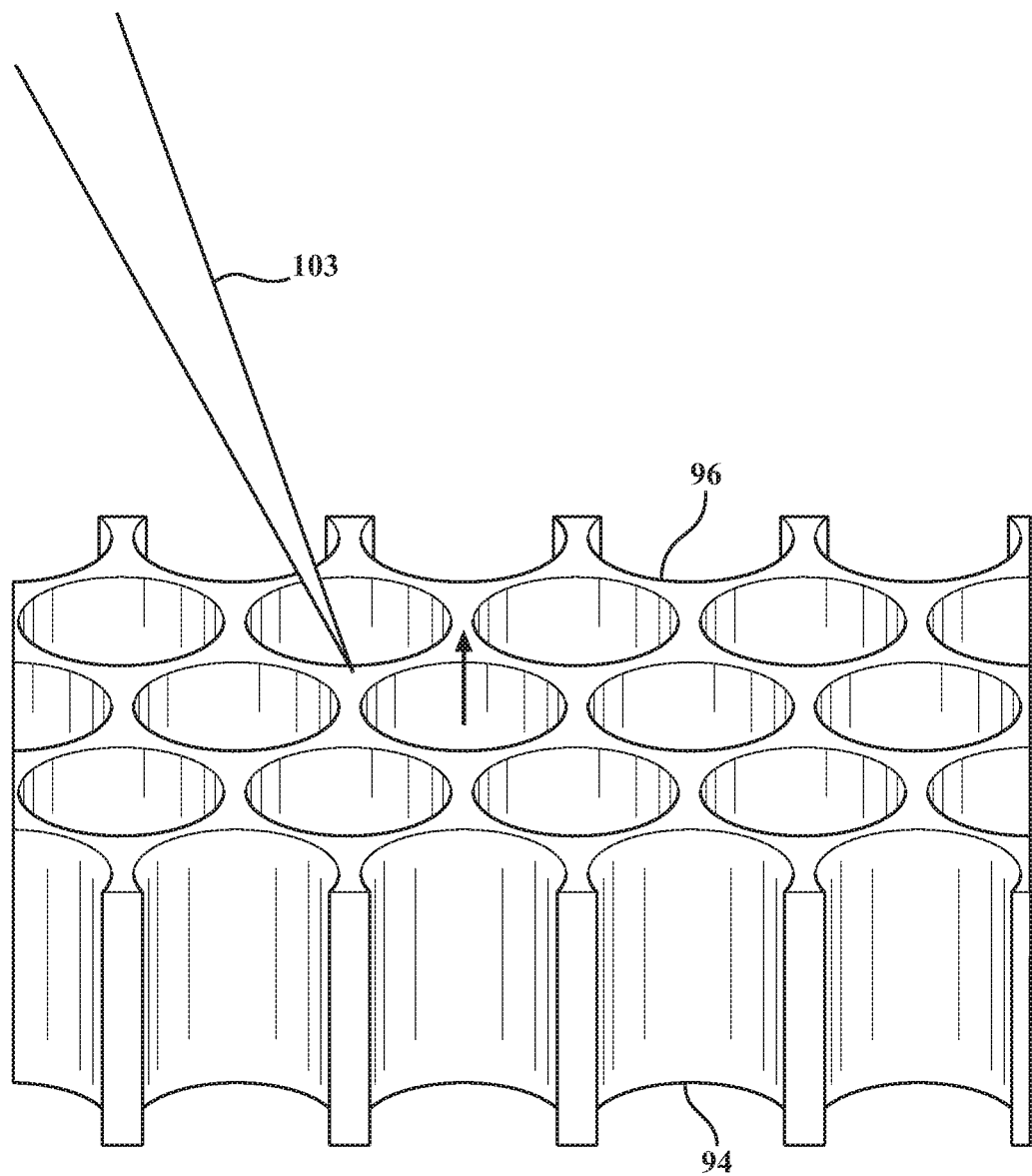
Figure 2D:
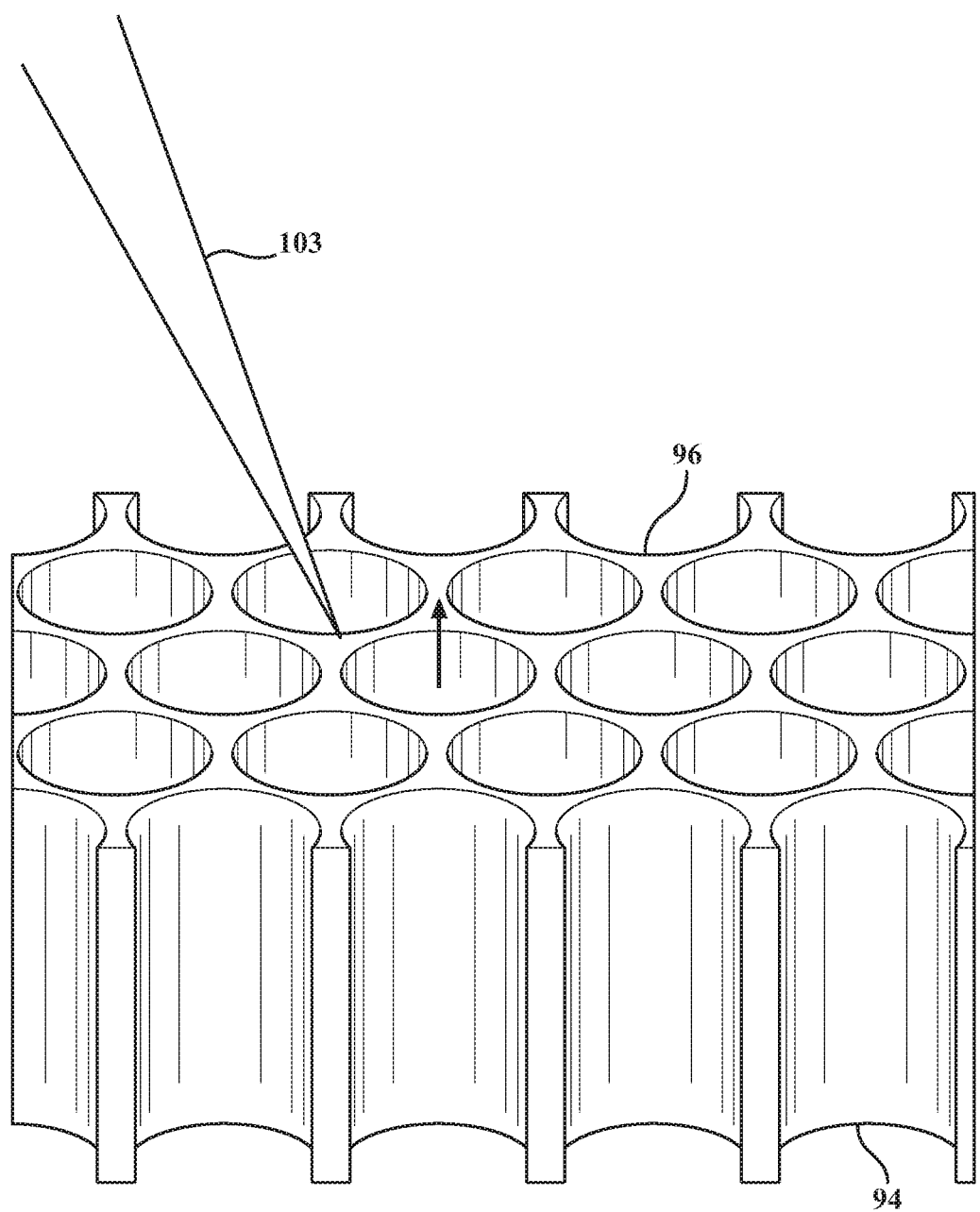

FIG. 2b depicts the perforated surface as shown at an angle from above with the laser aimed at the surface of the substrate 94 adjacent to some holes. The direction of fluidizing medium flow is upwards through the holes. The arrow indicates the upward direction of the velocity through one of the holes. The fluidized bed flows up through the holes in porous substrate 94. The size of the holes is sufficiently large so that particles can easily pass through the holes under the action of the fluidizing medium. The substrate 94 is lowered slightly below the fluidized bed surface 18, the action of the fluidized medium spreads the particles over the submerged substrate 94 and laser beam or beams 103 sinters particles to the substrate 94 in select locations. In this embodiment the computer 28, directs the aim of the laser to scan over the area of the perforated substrate 94 adjacent to the holes and builds the material in an upwards direction in such a way as to maintain a pathways to the hole structure of the perforated substrate 94. In this way a portion of the porous structure 96 is fabricated on the substrate 94 as depicted in FIG. 2c. As can be seen, the pores in the article 96 fabricated by this method continue to allow the fluidizing medium and fluidized particles to pass through it. The medium in the fluidized bed 16 flows up through the pores and transports particles through the pores. The article 96 is lowered slightly below the fluidized bed surface 18, the action of the fluidized bed 16 spreads the particles over the thus submerged article 96. The laser then sinters particles to the top surface of the new structure in select locations to fabricate further portions of the structure. FIG. 2d depicts a further portion thus fabricated. The process is continued until the structure is completed according to the model of the article in the computer.

Figure 3A:
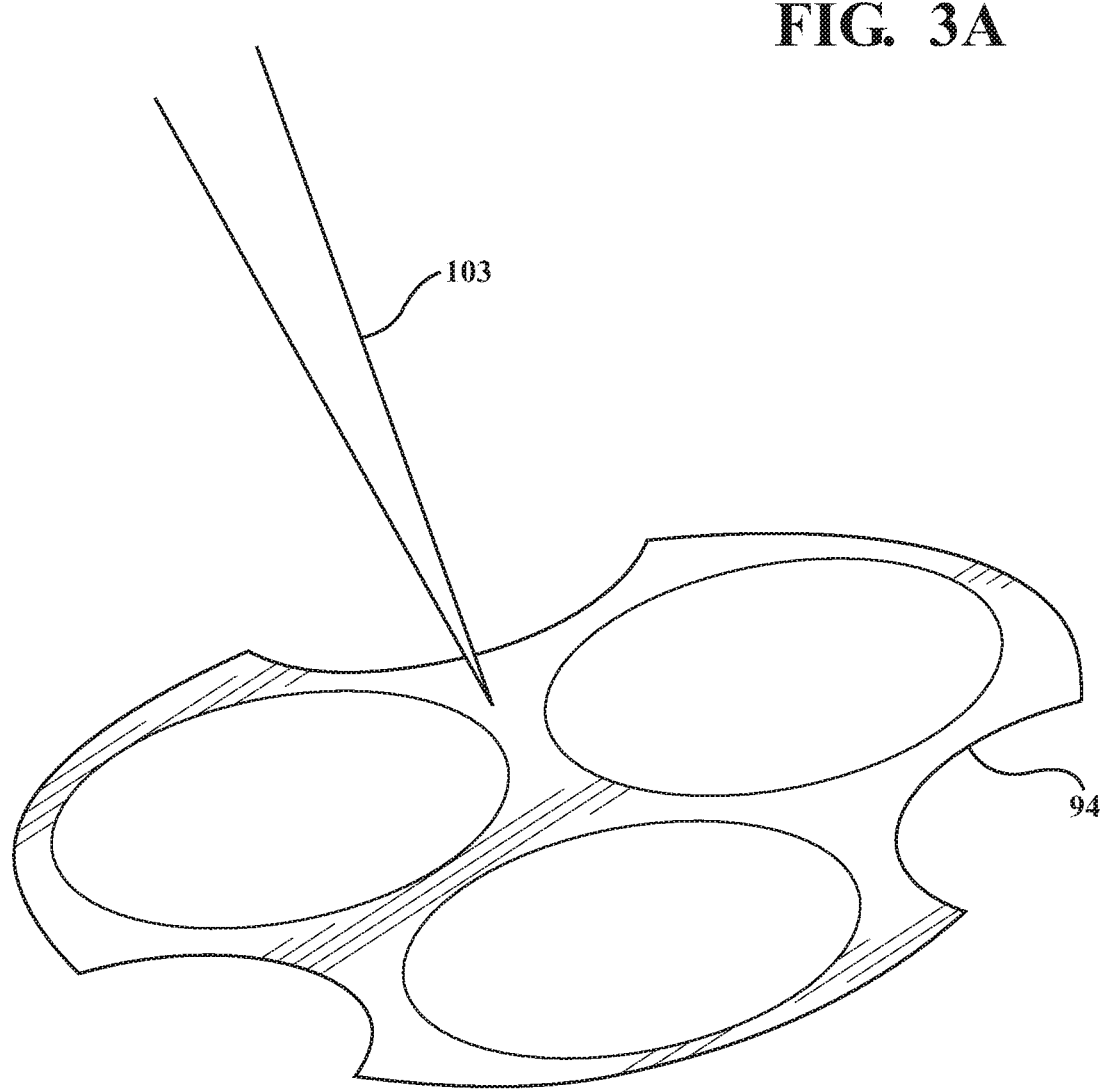
FIG. 3a-3g depict perspective views of various stages of fabrication of an example of a porous structure on a porous support.
Figure 3B:
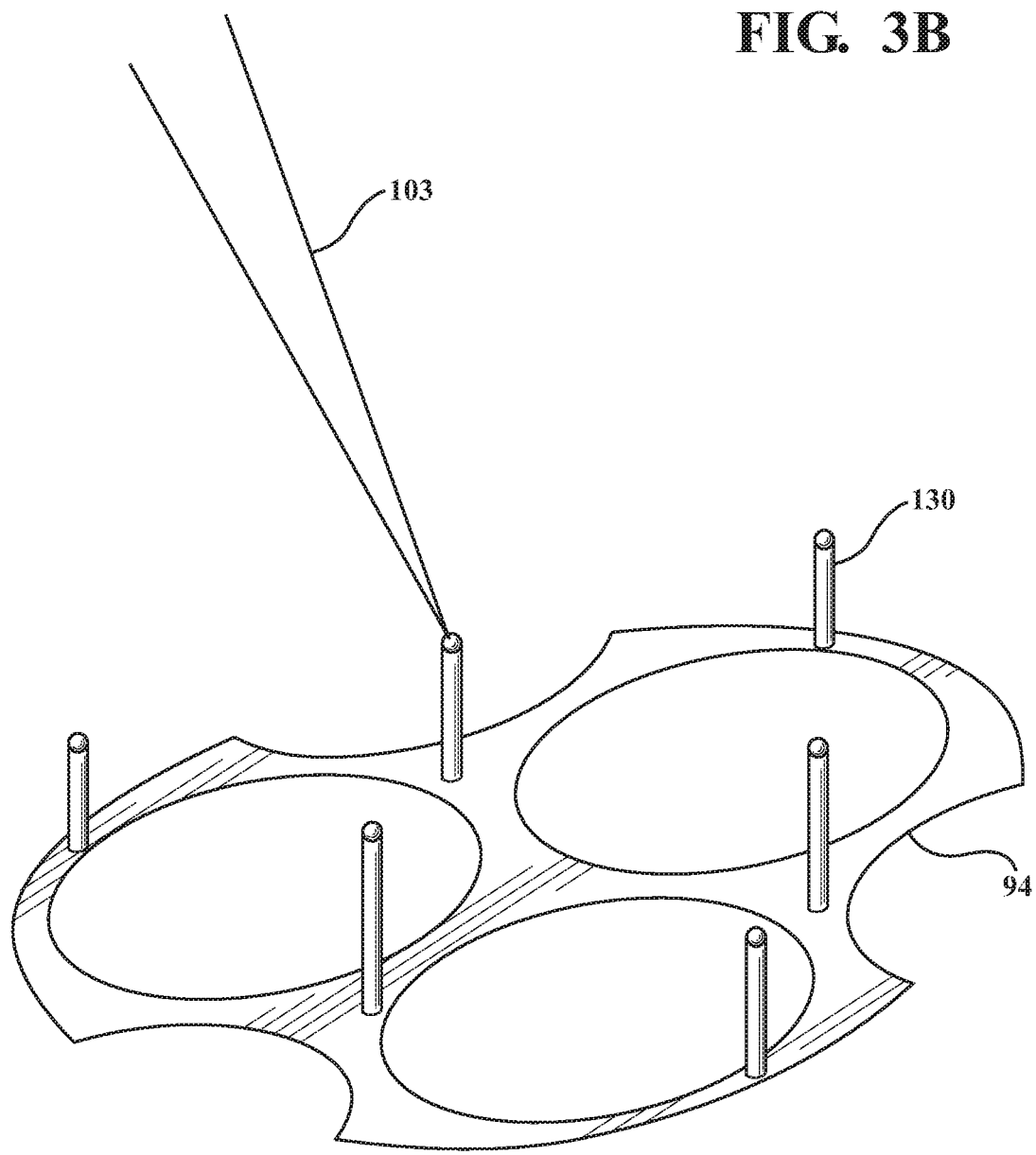
Figure 3C:
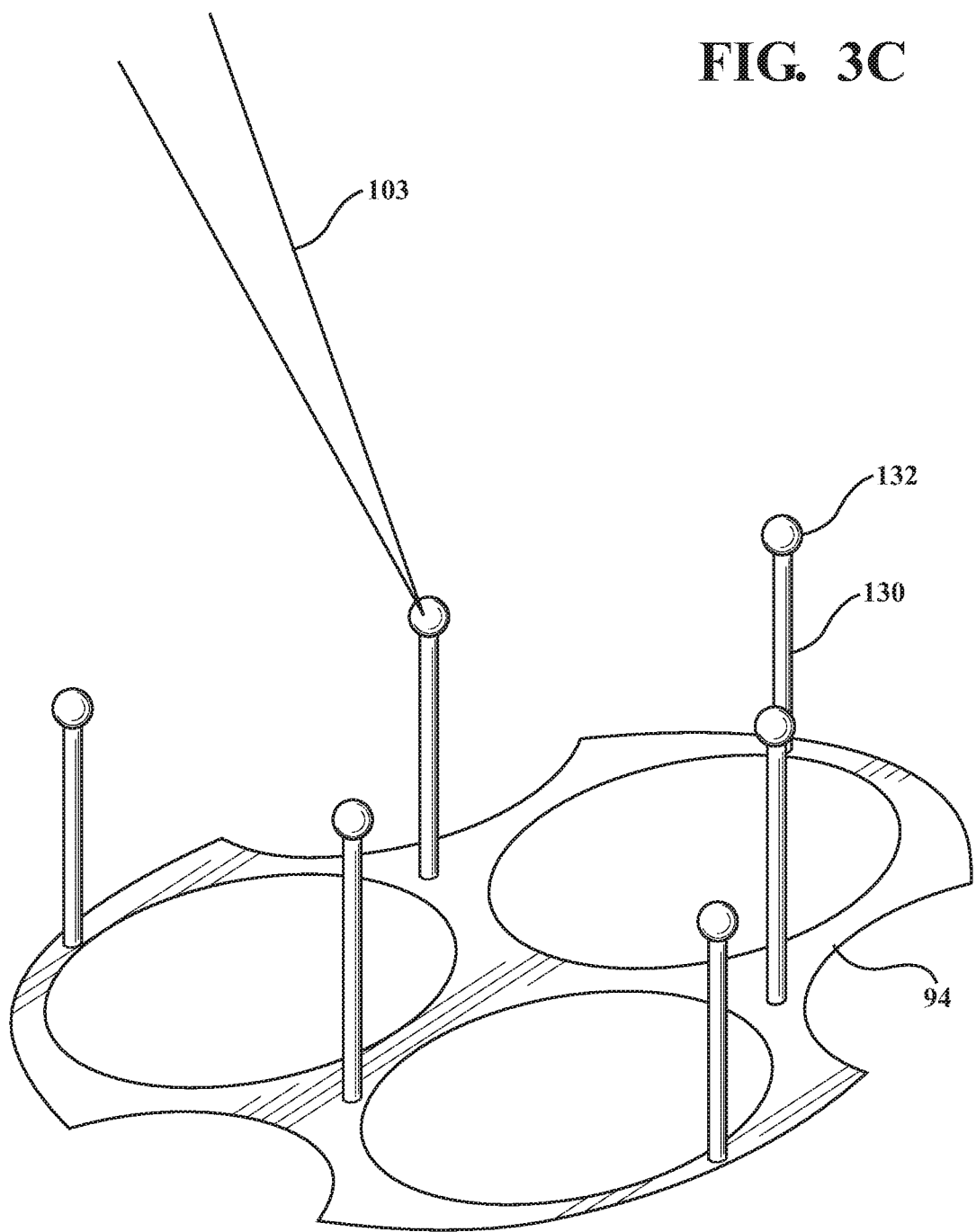
Figure 3D:
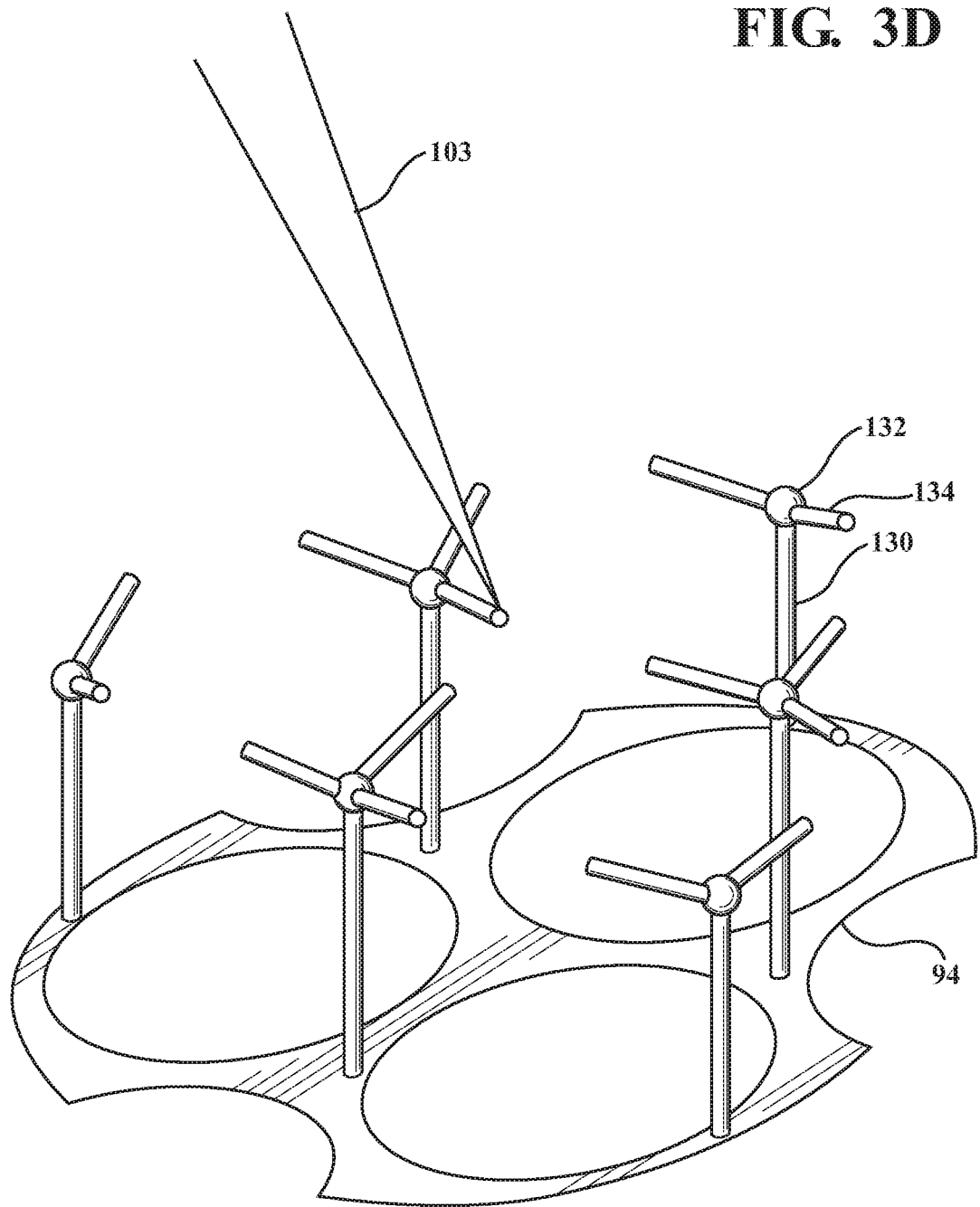
Figure 3E:
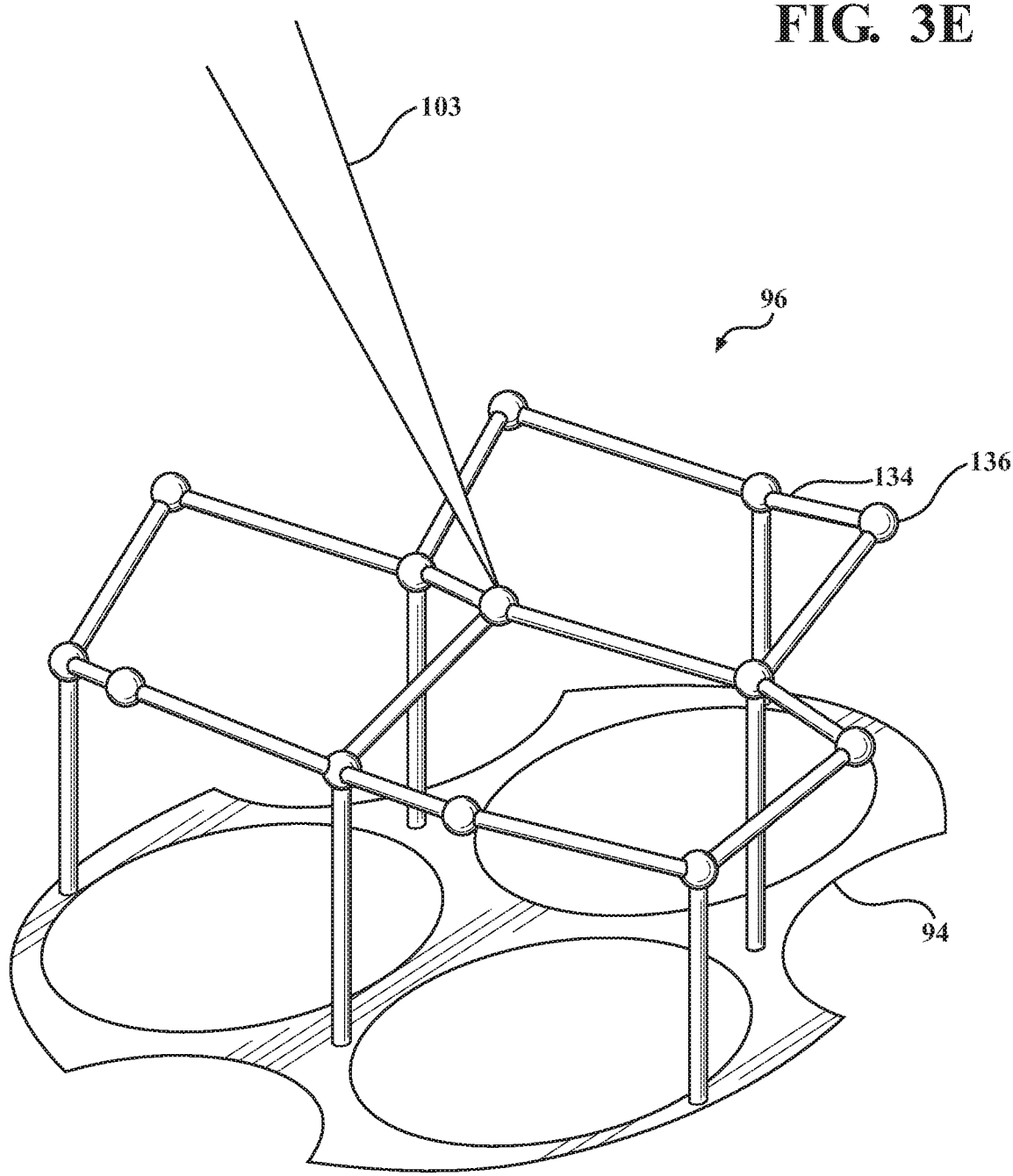
Figure 3F:
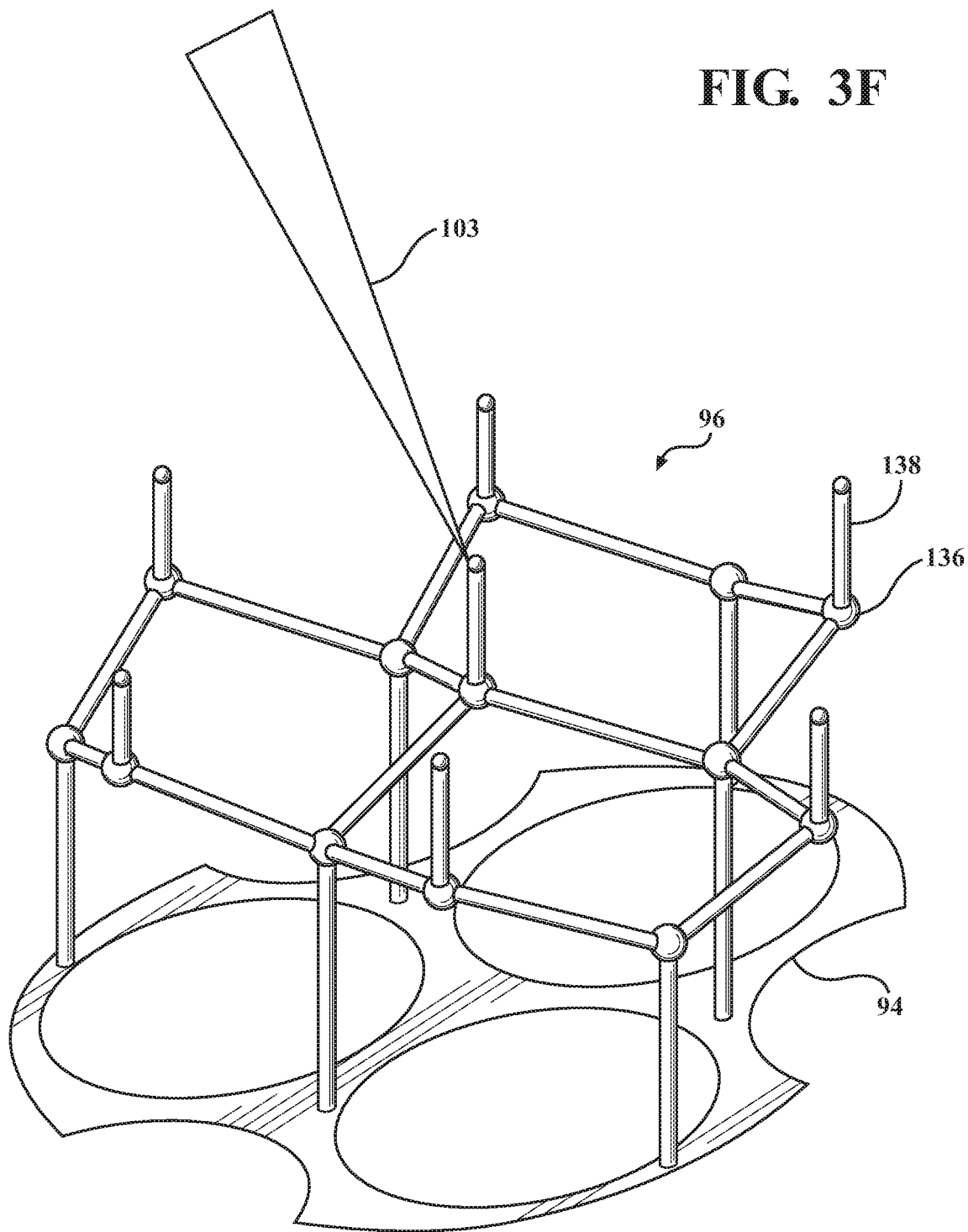
Figure 3G:
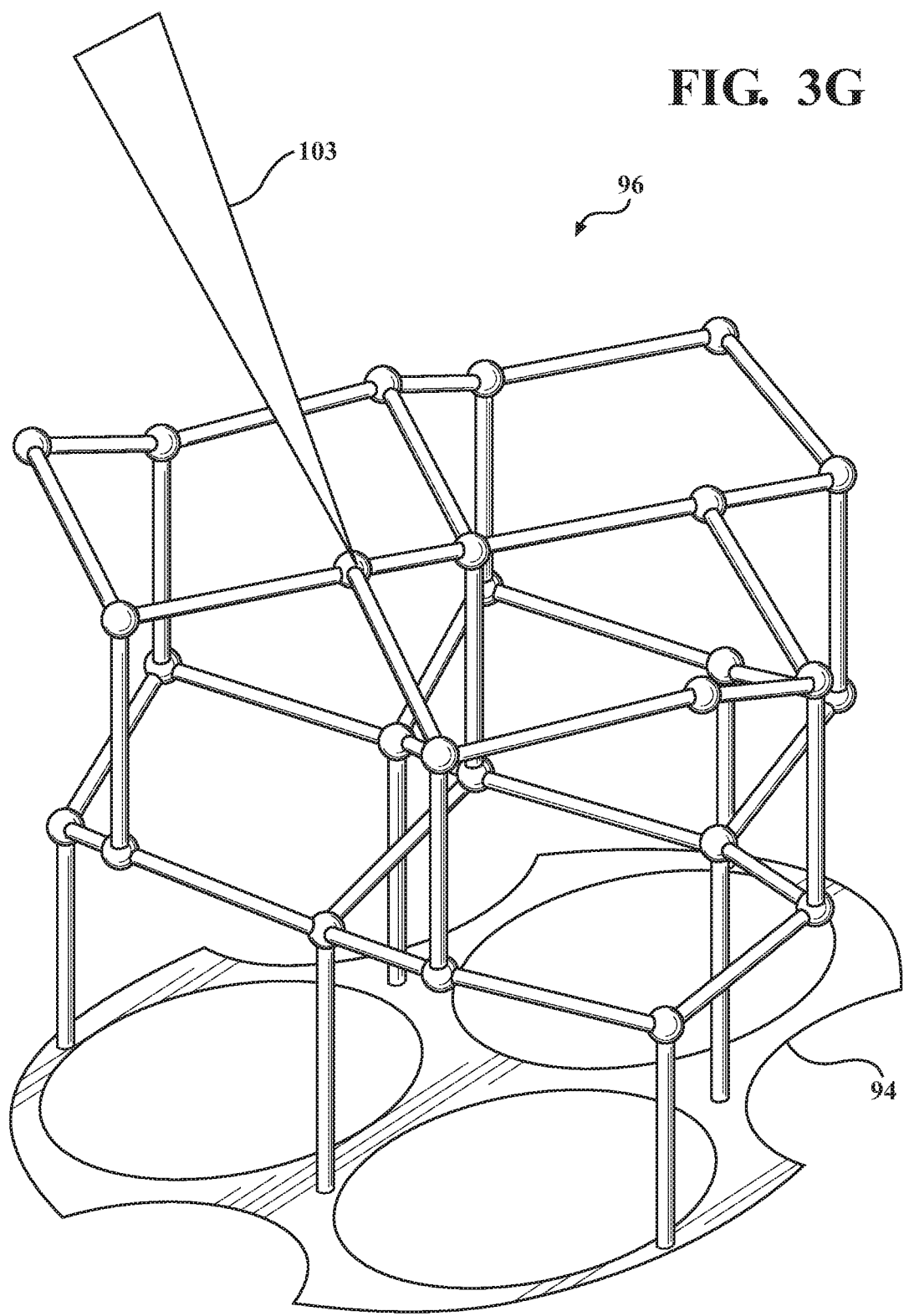

Turning now to another example of the fabricated porous structure, FIG. 3a-3g depict perspective views of various stages of the fabrication process of an open three dimensional honeycomb network structure. The structure is depicted very schematically as struts and nodes but may take on many forms. FIG. 3a depicts a perspective view of a portion of the perforated fabrication substrate 94. The process of fabrication is similar to that described above in FIG. 2a-2d except that the pore structure is more open. In the example of FIG. 3a-3g the pores are composed of unit cells defined by struts connected at nodes in a tetrahedral geometry. In FIG. 3b the laser beam scans the target areas to form a portion of multiple predetermined unit cells. The article 96 is started by building up vertical struts 130 from the surface of the perforated substrate 94 as shown in FIGS. 3b and 3c. The tops of the vertical struts form nodes 132 from which angled struts 134 are built up to connect at nodes 136 as depicted in FIGS. 3d and 3e. From nodes 136, vertical struts 138 are built up as depicted in FIG. 3f This process is continued to form a larger portion of the porous article 96 as depicted in FIG. 3g. The porous article 96 is interconnected and has pores large enough that the medium can pass through the structure and continue to transport particles within the article 96. The process is further continued until the entire volume of the article 96 being fabricated is filled in with the porous structure made up of interconnected struts.

Embodiments of the unit cells are composed of struts that can have a cross-sectional diameter as small as the size of a single particle or larger. In some embodiments, the size of the particles are as small as 10 microns in diameter. Particles smaller than 10 microns in diameter may begin cohering and may have difficulty smoothly fluidizing. As shown in FIG. 2, the length of the struts, or any structure forming the article 96, may be as long as the article 96. In some embodiments, the length of the each strut is greater than quadruple the particle diameter. In some embodiments, the width of the pores are greater than about 20 microns.

Embodiments of the unit cells are surface based, being composed of surfaces that can have a cross-sectional diameter as small as the size of a single particle or larger.

EXAMPLE EMBODIMENTS

Embodiments of the system 10 and the method of the present disclosure are included below but are not limited to those included below.

As can be appreciated it is not necessary for the porous structure to be built of unit cells that have tetrahedral geometry. The unit cells can have many different designs that give the structure a selected porosity. By varying the design of the unit cells, the orientation, shape and size of pores can be varied. For example, the unit cells can have dodecahedral, octahedral as well as many other types of shapes. The unit cells may take many forms both regular and irregular in size and orientation of struts. Irregular geometries may especially be needed to describe the surfaces of the article. The orientation, size, shape and composition of the pores may be varied depending on various needs for the properties of the final fabricated part.

Figure 5:
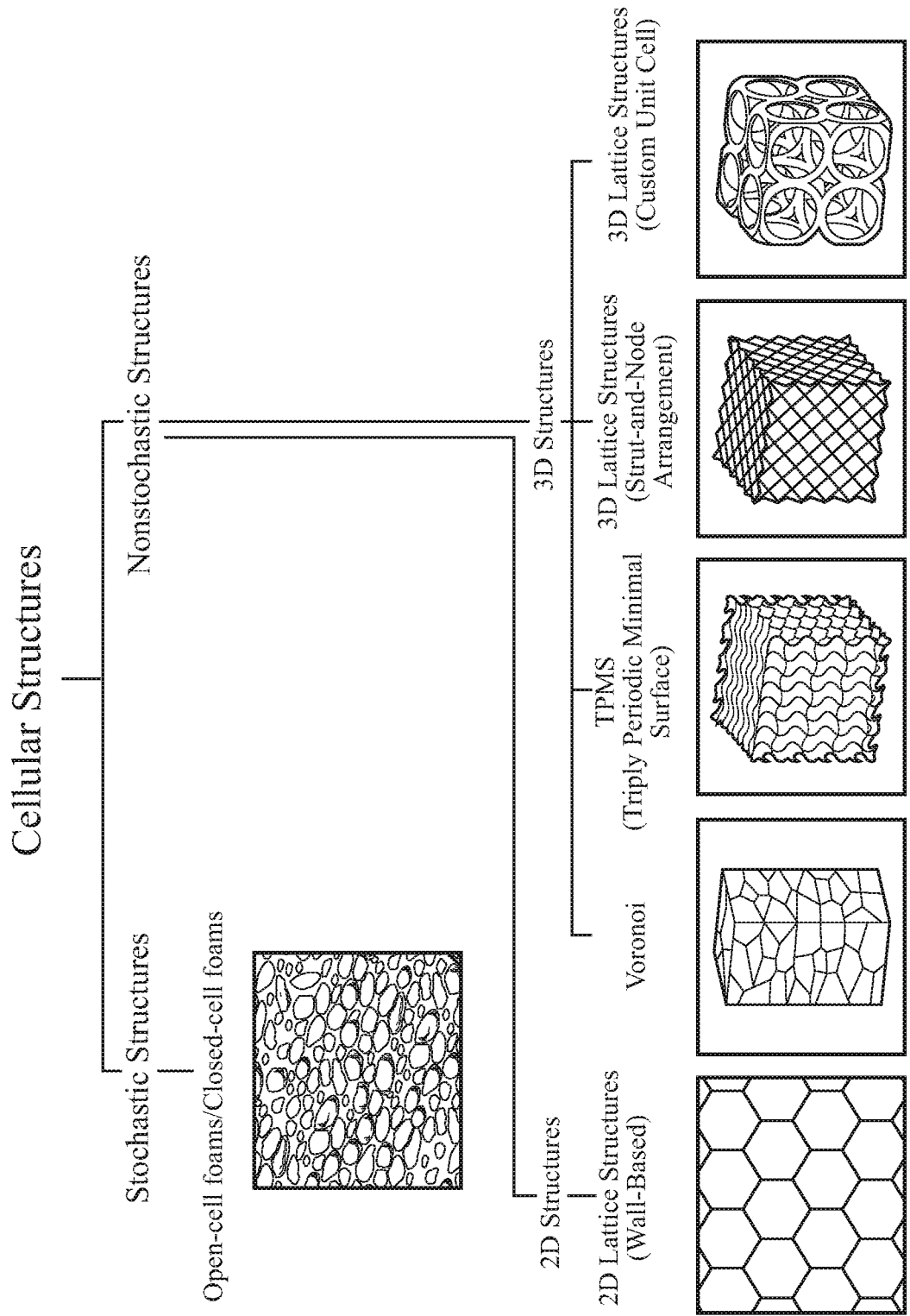
FIG. 5 depicts one or more of the many structures and/or arrangements that may be created by the method.
Figure 6A:
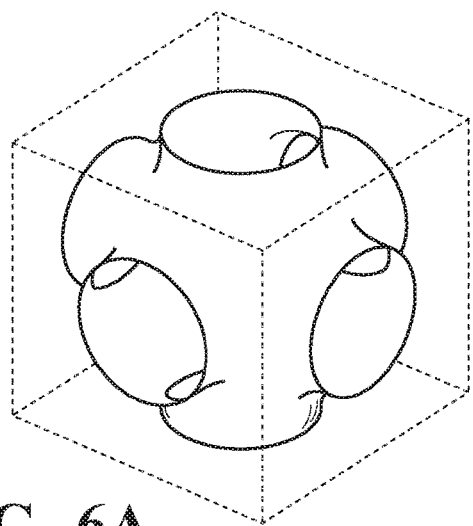
FIG. 6a-f depicts of additional structures that may be created by the method.
Figure 6B:
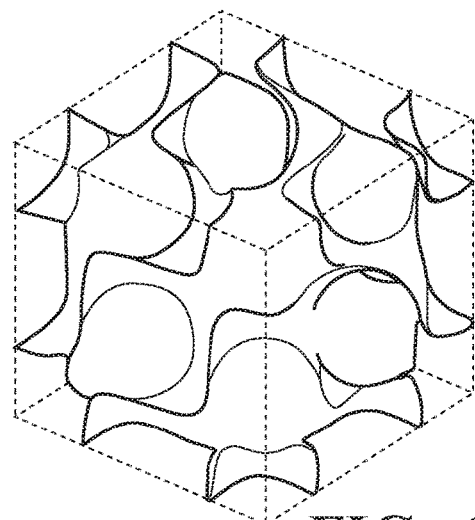
Figure 6C:
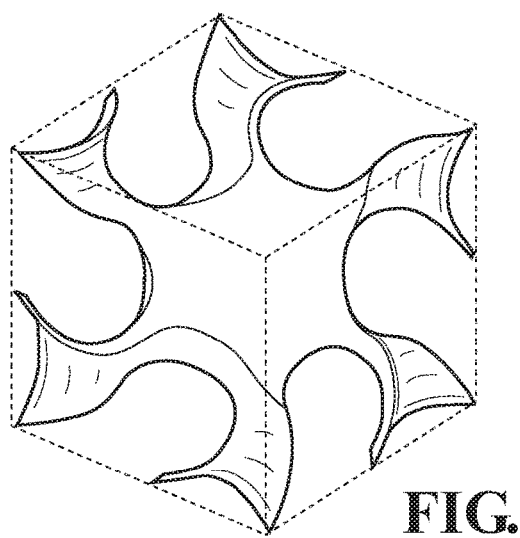
Figure 6D:
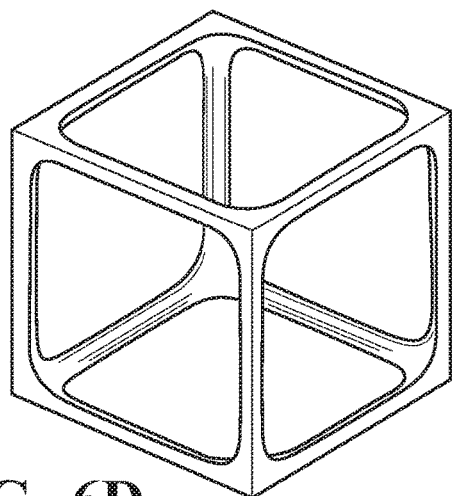
Figure 6E:
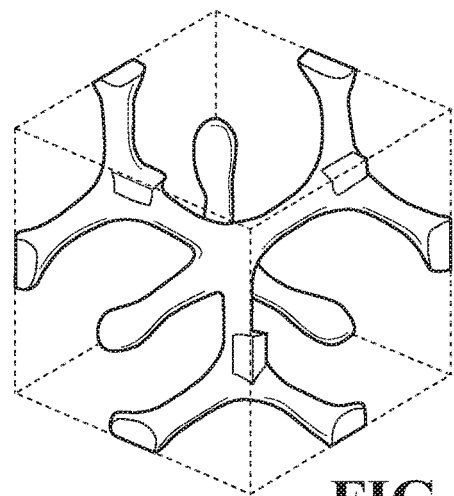
Figure 6F:
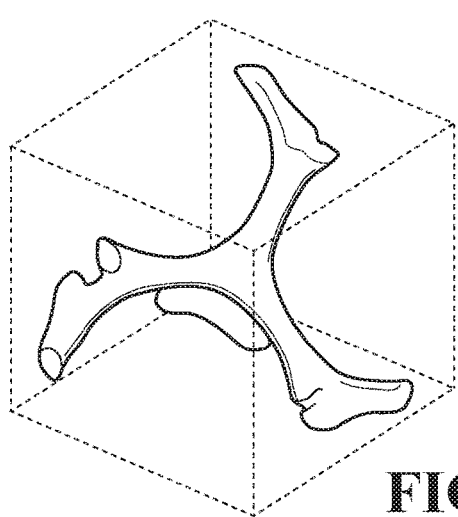
Figure 7A:
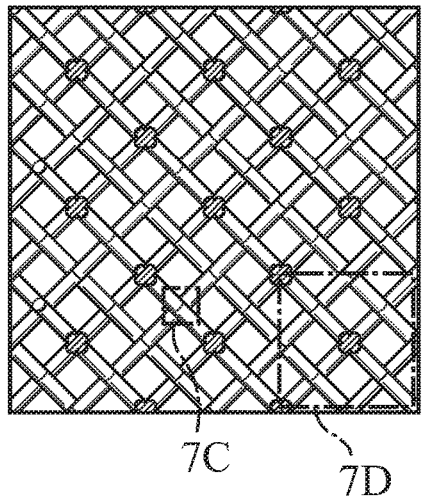
FIG. 7a-e depicts additional structures that may be created by the method.
Figure 7B:
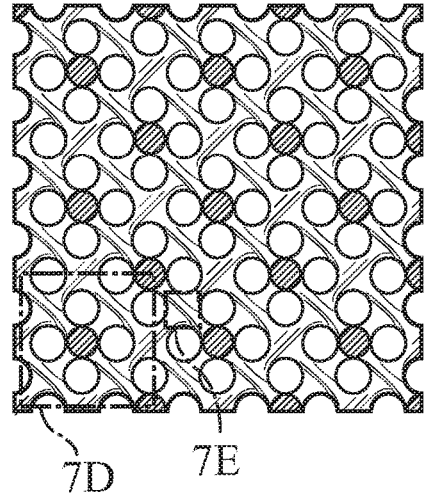
Figure 7C:
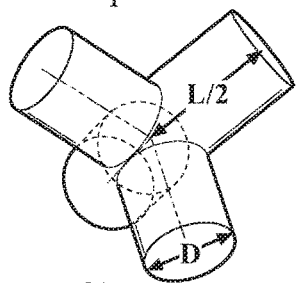
Figure 7D:
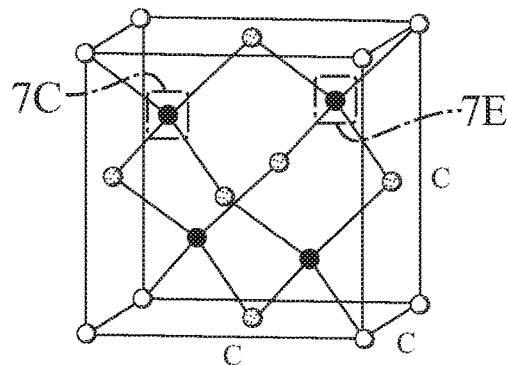
Figure 7E:
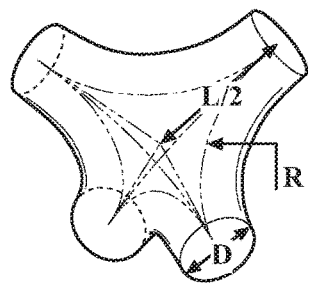

The article 96 may comprise microlattice material that has repeating cells defined by trusses (truss-lattice) or surfaces (surface based unit cell lattice). Microlattice materials can be lighter than air with densities less than 1 kg/m$^3$. Surface based unit cells are optimized over truss based unit cells for higher specific stiffness. Examples of surface based unit cell lattices are shown in FIGS. 5 and 6. The article 96 may comprise triply periodic minimal surface (TPMS) lattices or any other repeating structure. The article 96 may comprises a microlattice that is irregular. Such an irregular microlattice may have a Young's modulus greater than $E_s/\rho_s$.

The structure of the article 96 may vary over its volume such as by including include different unit cells at different locations in the article 96. For example, the article 96 may transition from truss based units cell to surface based until cells over its length. Repeating unit cells are not necessary. The article may have a continually changing structure, such as varying pore sizes and truss thicknesses.

As can be appreciated there can be different embodiments of the method. One embodiment is an iterative method. In this embodiment, the top surface of the portion of the structure under fabrication is raised up by lift 90 above the fluidized bed surface 18, selectively heated above its sticky temperature or partially melted by the laser and then immersed below surface 18 in the bed where particles from the fluidized bed impinge on the hot tacky surface and stick. The structure with the particles sticking to the build surface can then be raised again above the fluidized bed and selectively heated by the laser, and sintered or fused to the build surface. The process is then continued with repeated dunking and irradiation of the structure so that successive layers of particles build up on the surface that is irradiated.

Another embodiment is a continuous method. In this mode, the structure is fabricated by a continuous process. The build surface is held slightly below the surface of the fluidized bed. The build surface is irradiated to maintain a sufficiently high temperature so that it is partially melted or has sufficient tackiness for particles that collide with the surface to adhere and thus allow accretion to occur. As fresh structure builds up at the build surface, the structure is continuously lowered or the surface of the fluidized bed continuously raised or both so that the top of the build surface remains slightly below the fluidized bed surface. Multiple laser beams can be used to irradiate multiple build surfaces simultaneously to trace out the pattern of the porous structure as the article is being lowered into the fluidized bed.

In another embodiment of the method, the particle bed is fluidized intermittently. In this embodiment, the structure being fabricated is submerged in the fluidized bed to a certain depth. The fluidization is then stopped by reducing the velocity of the fluidization medium below the fluidization velocity by closing second valve 24. The depth to which the structure is submerged is such that when fluidization is stopped, the structure is covered by a thin layer of particles. Selective laser sintering can then take place on the quiescent layer of particles sitting on the surface of the structure so as to fabricate a cross-sectional slice of the structure. After sintering, the fluidizing medium velocity is increased to above $u_{mf}$ to re-fluidize the bed, the structure is submerged once again and the process is repeated thus building up successive layers of the structure.

Many types of particles are suitable. Examples of the type of particles that can be used can have the following properties:

- The particles can be fused or sintered by an energy beam such as a laser or an electron gun. Examples of such particles include polymers, metals, ceramics, composites and mixtures thereof. Examples of polymers include thermoplastic polymers such as but not limited to polyamides, polypropylene and polyethylene as well as thermosetting polymers. Examples of metals include but are not limited to titanium and its alloys, aluminum, stainless steel, cobalt chrome alloys, and other metals. The particles can also be a mixture of one or more metal particles types with one or more polymer particles types. The particles can also be composed of particles comprising a mixed composition of one or more metals and one or more polymers.
- The particles can be fluidized. This means that for example the particles are not too small that interparticle forces become relatively large enough to make fluidization difficult.
- The particle size distribution can be such that most particles can easily pass through pores of the structure under fabrication.

In addition to particles that are used for building the article, additives such as anti-oxidants for polymers can be mixed into the fluidized bed so that the additives are incorporated into the structure.

If a laser is used for the energy beam, then a $CO_2$ laser is one example because of the power, availability and cost, but any type of laser that can sinter or fuse the particles is suitable. Lasers that are appropriate emit radiation with a wavelength that is sufficiently absorbed by the particles material to allow sintering to take place. Fabrication can take place in multiple locations on the surface by splitting the laser beam into a multitude of beams each selectively directed at a target on the surface. Alternatively beams from multiple lasers can be used. The beam can be focused so as to concentrate power in a small target area. In certain cases where the relative sintering power of the laser is strong, the beam can be passed through a mask so that a large cross-sectional area can be fabricated at the same time. The laser can be directed by different methods including by oscillating the beam aim with an oscillating mirror. A pulsing beam or a continuous beam can be used.

Many different types of fluids can be used that are suitable for both fluidization and heat removal. These fluids can be gases, liquids or supercritical fluids. Non-limiting examples of gases are air, nitrogen, carbon dioxide, helium, neon, argon. The fluidizing gas can be pressurized. It may be advantageous for heat removal or fluidization quality to use a pressurized gas. Instead of a gas as fluidizing medium it may be advantageous to use a supercritical medium such as but not limited to supercritical propane, ethane or carbon dioxide. The fluidizing medium can be either inert or reactive to the structure. For some applications a reactive gas such as methane or hydrogen can be used when the particles is a metal. For particles with high density such as metals it can be advantageous to use a fluidizing medium with higher density than a gas such as a supercritical medium or liquid.

In one embodiment, the fluidizing medium is not recycled. Gas from the holding vessel 30 or air is used for fluidization in in the primary vessel 12 and collected or vented to the atmosphere through lines 40 and 44.

An alternative example of the layout in FIG. 1 has different particle types in multiple vessels such as storage vessel 60 from which it is possible to feed different particles types to the fluidized bed in the primary vessel 12. By feeding different types of particles during different phases of the fabrication, it is possible to change the composition of the particles of the fluidized bed to a different particles type. Since the composition of the fabricated structure is dependent on the composition of the particles in the bed, as the fluidized bed particles composition changes, the composition of particles being sintered changes and the composition of the fabricated structure changes. If the composition of particles in the fluidized bed is changed during fabrication then the article 96 will have a gradient of compositions. In this way an article can be fabricated with varying properties at different locations in its volume. The composition can be changed either gradually or rapidly, in some versions. If the composition of the fluidized bed is changed rapidly, then the material composition of the article may change over the length scale of a single particle. If the composition of the fluidized bed is changed gradually, then the length scale of change in the article would be larger, for example, 1 cm. This type of article can be useful for a number of different applications including mechanical and optical. For example, the material of the article 96 may be varied between a stiff materials, such as metals, to a rubbery material, such as certain polymers, in different locations of the article thus giving it special mechanical properties. Examples of polymers that are rubbery include elastomers like polyisoprene, polybutadiene, styrene-butadiene rubber (copolymer of styrene and butadiene), EPM (ethylene propylene rubber, a copolymer of ethylene and propylene), EPDM rubber (ethylene propylene diene rubber, a terpolymer of ethylene, propylene and a diene-component), and ethylene vinyl acetate (EVA).

Figure 4:
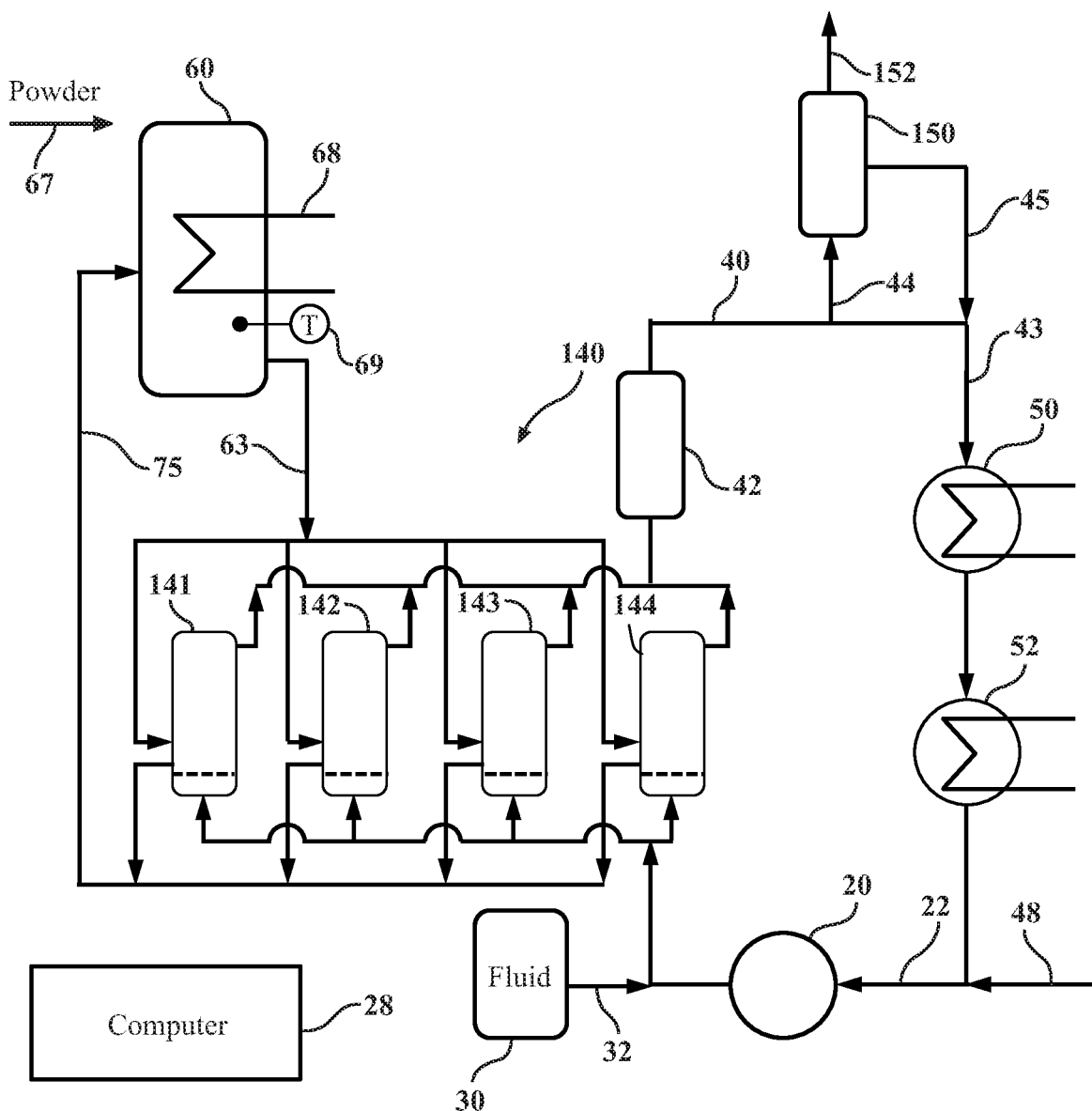
FIG. 4 depicts a schematic view of an example of an array of fluidized bed additive manufacturing units.

It can be appreciated that the equipment that services an FBAM unit, including particles holding and medium holding vessels, instrumentations, valves, heat exchangers, units for purification and pumps (or compressors) in the layout in FIG. 1 can add considerable cost per article fabricated. In an embodiment, much of this equipment is shared over multiple FBAM units such as FBAM unit 10 depicted in FIG. 1 each comprising a vessel much like the primary vessel 12 fitted with a distributor plate, laser, lift, cameras and individual temperature control. Each FBAM unit is connected to a computer or multiple computers that control the additive manufacturing and fluidized bed process in each vessel. The multiple FBAM units can be configured in an array and serviced by a shared cooler, compressor, and particles handling system. An example of an array 140 of four FBAM units 141, 142, 143 and 144 is depicted in FIG. 4. As can be appreciated, many more than four FBAM units can be configured in a vast array including hundreds, thousands or more FBAM units. For each additional FBAM unit in the array, the particles handling, storage, compressor, purification and heating units can be sized accordingly to be able to handle the additional particles and medium requirements. Note that in FIG. 4, the valves in the lines are not shown but are appropriately placed, particularly so that the fluidization in each FBAM unit can be controlled separately, and particles can be added and removed to each FBAM unit independently. Each FBAM unit can be individually isolated from the medium flow by closing valves similarly placed to valves 24 and 41 in FIG. 1 on each FBAM unit 141, 142, 143 and 144.

The sintering or fusing process in each FBAM unit generates volatiles that would build up in the recirculating medium stream. In the example depicted in FIG. 4, a purification unit partially separates volatiles from stream 44 in separation unit 150. Volatiles separated by unit 150 are removed through line 152. Purified medium is returned to recirculation recycle line 43 through the fourth line 45.

OTHER EMBODIMENTS

It can be appreciated from the foregoing that while certain examples of this disclosure have been depicted and described, they do not limit the embodiments and modifications that can be made without departing from the spirit and scope of this disclosure. Other embodiments can include one or more of the following versions.

A method of fabrication comprising:
fluidizing particles with a medium to form a fluidized bed having a surface 18,
additively manufacturing an article comprising the particles, the article having an open porosity,
forming a plurality of pores in the article that define fluid paths through the article, and
flowing the particles and the medium through the fluid paths while the article and the fluid paths are being formed.

The method of any of these embodiments wherein additively manufacturing the article further comprises additively manufacturing the article with a non-stochastic structure.

The method of any of these embodiments further comprising simultaneously flowing the particles and the medium through all of the pores in the article.

The method of any of these embodiments wherein additively manufacturing further comprises flowing produced volatiles away from the article.

The method of any of these embodiments further comprising cooling the fluidized bed and the article while additively manufacturing the article.

The method of any of these embodiments further comprising:
heating the particles at a target on the article, and
stabilizing the article by flowing the particles and the medium adjacent the target.

The method of any of these embodiments wherein forming the plurality of pores comprises forming interconnected pores.

The method of any of these embodiments wherein additively manufacturing the article further comprises additively manufacturing a plurality of struts converging at nodes comprising the article, such that the struts and nodes define the pores.

The method of any of these embodiments further comprising filling some of the pores with the particles to further form the struts and nodes.

The method of any of these embodiments further comprising:
providing the article with a volume, and
filling a majority of the volume with the particles and the medium.

The method of any of these embodiments further comprising substantially filling an entirety of the volume with the particles and the medium.

The method of any of these embodiments wherein the plurality of pores comprises a majority of the volume.

The method of any of these embodiments wherein flowing the particles and the medium through the fluid paths comprises pumping the particles and medium through the fluid paths.

The method of any of these embodiments wherein flowing the particles and the medium through the fluid paths comprises enveloping the article within the fluidized bed by moving the article.

The method of any of these embodiments wherein flowing the particles and the medium through the fluid paths comprises enveloping the article within the fluidized bed by changing the height of the fluidized bed.

The method of any of these embodiments wherein flowing the particles and the medium through the fluid paths comprises changing a pressure of the medium to change a level of the surface.

The method of any of these embodiments further comprising:
additively manufacturing a top on the article, and further comprising:
leveling the top of the article with the surface 18 of the fluidized bed such that the fluidized bed envelopes the top and the top is adjacent the surface 18 of the fluidized bed;
continuously lowering the article into the fluidized bed; or
continuously raising the surface of the fluidized bed.

The method of any of these embodiments further comprising:
supporting the article on a substrate defining a plurality of channels extending through the substrate, and
flowing particles and the medium through all of the channels in the substrate.

The method of any of these embodiments further comprising binding the article to the substrate.

The method of any of these embodiments wherein the substrate is a mesh.

The method of any of these embodiments further comprising:
defining the particles with an average diameter dp, and
defining the channels with a minimum diameter of at least about twice the average diameter dp of the particles.

The method of any of these embodiments wherein the channels have varying diameters.

The method of any of these embodiments wherein the fluid paths have a minimum diameter of at least about twice the average diameter dp of the particles.

The method of any of these embodiments 8 further comprising forming the substrate from a same material as the particles.

The method of any of these embodiments further comprising pressurizing the medium to increase a heat capacity of the medium and thereby increasing a rate of heat dissipation.

The method of any of these embodiments further comprising:

providing the particles as first particles and second particles wherein the first particles and the second particles comprise different materials, temporally varying a ratio of the first particles to the second particles in the fluidized bed, additively manufacturing the article having a spatially varied material composition of the first particles and the second particles.

The method of any of these embodiments wherein the particles have an average outer dimension of at least about 10 microns and not greater than about 1 mm.

The method of any of these embodiments wherein the particles comprise a metal.

The method of any of these embodiments wherein the particles comprise a polymer.

The method of any of these embodiments wherein the polymer comprises a material selected from the group consisting of polyamide 6, polyamide 12, polypropylene, polyethylene, polyethylene terephthalate, polybutylene terephthalate, polyoxymethylene, polystyrene, poly(methyl methacrylate) or any combination thereof.

The method of any of these embodiments wherein additively manufacturing further comprises visually monitoring the additive manufacturing within a transparent zone of the fluidized bed, the transparent zone extending a distance D below the surface 18 of the fluidized bed.

The method of any of these embodiments further comprising increasing the distance D of the transparent zone by increasing a velocity of the medium of the fluidized bed.

The method of any of these embodiments further comprising maintaining the particles within a vessel, and continuously circulating the medium into the vessel, through the particles and out of the vessel.

The method of any of these embodiments further comprising sealing the medium and the particles within a closed system.

The method of any of these embodiments further comprising focusing a plurality of energy beams onto a target on the article to concentrate the power of the energy beams.

The method of any of these embodiments wherein the energy beam is a laser beam.

The method of any of these embodiments wherein the energy beam is an electron beam.

The method of any of these embodiments where the medium is selected from the group consisting of air, nitrogen, carbon dioxide and an inert gas, or any combination thereof.

The method of any of these embodiments wherein the medium is a supercritical fluid.

The method of any of these embodiments wherein fluidizing the particles with the medium to form the fluidized bed further comprises:

conveying the particles into a primary vessel 12 having a top and a bottom and defining a chamber and conveying the particles above a distributor plate 14 extending horizontally across the chamber near the bottom of the primary vessel 12, the distributor plate having a plurality of holes, and pumping the medium upward through the holes in the distributor plate 14 such that a superficial velocity of the medium is greater than a minimum fluidization superficial velocity $u_{mf}$.

The method of any of these embodiments further comprising:

additively manufacturing a first horizontal cross section of the article within the fluidized bed and adjacent the surface 18 of the fluidized bed, and additively manufacturing one or more additional horizontal cross sections on top of the first horizontal cross section wherein all of the horizontal cross sections define the article.

The method of any of these embodiments wherein additively manufacturing comprises sintering the particles, with the particles having a sintering window defined as a temperature range from a crystallization temperature to a melting temperature.

The method of any of these embodiments further comprising depositing particles on the article by reducing the velocity of the medium to below the minimum fluidization superficial velocity $u_{mf}$.

The method of any of these embodiments further comprising:

wherein the article comprises a top and a bottom, and heating the top to maintain the temperature of the top in the sintering window and cooling the bottom to below the sintering window to create a temperature gradient within the article.

The method of any of these embodiments wherein sintering the particles comprises emitting an energy beam at a target on the article.

The method of any of these embodiments wherein additively manufacturing the article further comprises:

additively manufacturing the article comprising a microlattice that is irregular.

The method of any of these embodiments wherein additively manufacturing the article further comprises:

additively manufacturing the article comprising a material that has a Young's modulus $E_s$ and a density $\rho_s$, additively manufacturing the article with a Young's modulus E and a density ρ that follow the relationship: $E/\square \geq E_s/\rho_s$.

The method of any of these embodiments wherein additively manufacturing the article further comprises:

additively manufacturing the article comprising a material that has a Young's modulus $E_s$ and a density $\rho_s$, additively manufacturing the article with a Young's modulus E and a density ρ that follow the relationship: $E/\square \geq (\rho/\rho_s)^2 E_s/\rho_s$.

The method of any of these embodiments wherein additively manufacturing an article further comprises additively manufacturing the article the article a Young's modulus E and a ρ that follow the relationship: $E/\square \leq E_s/\rho_s$.

The method of any of these embodiments wherein additively manufacturing the article further comprises:

additively manufacturing the article with a porosity φ of at least about 50%.

The method of any of these embodiments wherein additively manufacturing the article further comprises:

additively manufacturing the article with a porosity φ of at least about 60%.

The method of any of these embodiments wherein additively manufacturing the article further comprises:

additively manufacturing the article with a porosity φ of at least about 70%.

The method of any of these embodiments wherein additively manufacturing the article further comprises:

additively manufacturing the article with a porosity φ of at least about 80%.

The method of any of these embodiments wherein additively manufacturing the article further comprises:

additively manufacturing the article with a porosity φ of at least about 90%.

The method of any of these embodiments wherein additively manufacturing the article further comprises:

additively manufacturing the article with a porosity φ of at least about 95%.

The method of any of these embodiments wherein additively manufacturing the article further comprises:
additively manufacturing the article with a porosity φ of at least about 99%.

The method of any of these embodiments wherein additively manufacturing the article further comprises:
additively manufacturing the article with a porosity φ of at least about 99.9%.

The method of any of these embodiments wherein additively manufacturing the article further comprises:
additively manufacturing the article with a porosity φ of at least about 99.99%.

The method of any of these embodiments wherein additively manufacturing the article further comprises:
additively manufacturing the article with a porosity φ of not greater than 50%.

The method of any of these embodiments wherein additively manufacturing the article further comprises:
additively manufacturing the article with a porosity φ of not greater than 60%.

The method of any of these embodiments wherein additively manufacturing the article further comprises:
additively manufacturing the article with a porosity φ of not greater than 70%.

The method of any of these embodiments wherein additively manufacturing the article further comprises:
additively manufacturing the article with a porosity φ of not greater than 80%.

The method of any of these embodiments wherein additively manufacturing the article further comprises:
additively manufacturing the article with a porosity φ of not greater than 90%.

The method of any of these embodiments wherein additively manufacturing the article further comprises:
additively manufacturing the article with a porosity φ of not greater than 95%.

The method of any of these embodiments wherein additively manufacturing the article further comprises:
additively manufacturing the article with a porosity φ of not greater than 99%.

The method of any of these embodiments wherein additively manufacturing the article further comprises:
additively manufacturing the article with a porosity φ of not greater than 99.9%.

The method of any of these embodiments wherein additively manufacturing the article further comprises:
additively manufacturing the article with a porosity φ of not greater than 99.99%.

The method of any of these embodiments wherein the pores have a minimum diameter of at least about 20 microns.

The method of any of these embodiments wherein additively manufacturing the article further comprises:
additively manufacturing the article comprising particles with average outer dimension $d_p$, and
additively manufacturing the struts having a length that is quadruple the average outer dimension $d_p$.

The method of any of these embodiments wherein additively manufacturing the article further comprises:
additively manufacturing the article comprising a microlattice.

The method of any of these embodiments wherein additively manufacturing the article further comprises:
additively manufacturing the article comprising repeating unit cells that are surface based.

The method of any of these embodiments wherein additively manufacturing the article further comprises:
additively manufacturing the article comprising repeating unit cells that are surface based.

The method of any of these embodiments wherein additively manufacturing the article further comprises:
additively manufacturing the article comprising triply periodic minimal surface lattices.

The method of any of these embodiments wherein additively manufacturing the article further comprises:
additively manufacturing the article comprising repeating unit cells that are truss based.

A system 10 for fabricating an article, the system comprising:
a primary vessel 12 being impermeable to fluids and insulated and having a vertical axis Z and a horizontal axis X perpendicular to the vertical axis Z and a top and bottom being vertically spaced apart,
the primary vessel 12 including a window 104 at the top, the primary vessel 12 defining a chamber 13 and having a hatch 98 which can be opened to provide access to the chamber,
a distributor plate 14 disposed in the primary vessel 12 and extending horizontally across the chamber, the distributor plate having a plurality of holes, and
a fluidized bed disposed in the chamber and having a surface 18 above the distributor plate 14, the fluidized bed being expandable and having particles, the particles having an average outer dimension $d_p$ that is at least about 10 microns and not greater than about 1 mm, the fluidized bed having a medium with a superficial velocity u that is greater than a minimum fluidizing superficial velocity $u_{mf}$ of the particles.

The system 10 of any of these embodiments wherein the fluidized bed has a transparent zone that is at least partially transparent and which extends a distance D below the surface 18 and the article is formed in the transparent zone.

The system 10 of any of these embodiments further comprising:
a lift device 90 in the chamber 13 and attached to the primary vessel 12 being capable of moving vertically, and
a frame attached 92 to the lift device 90 and being vertically movable by the lift device 90 and extending at least partially around the perimeter of the primary vessel 12 and having openings 93.

The system 10 of any of these embodiments further comprising:
a substrate 94 disposed in the chamber and defining channels that are of varying size and that are larger than average outer dimension $d_p$ of the particles such that the particles can flow through the channels, holes and openings.

The system 10 of any of these embodiments further comprising:
a first camera 106 mounted adjacent the primary vessel 12 and directed toward the surface 18 for visually monitoring fabrication of the article.

The system 10 of any of these embodiments further comprising:
a second camera 108 of an infrared type mounted adjacent the primary vessel 12.

The system 10 of any of these embodiments further comprising an energy beam source 100.

The system 10 of any of these embodiments further comprising, for the energy beam source, optical components 102 comprising at least one prism and at least one mirror assembly comprising at least one mirror coupled to at least one galvanometer.

The system 10 of any of these embodiments further comprising:
a first heat exchanger 56 coupled to the primary vessel 12, and
a first temperature monitoring device 54 disposed in the chamber.

The system 10 of any of these embodiments further comprising a first pressure tap 38 coupled to the primary vessel 12 toward the top and above the fluidized bed and a second pressure tap 39 coupled to the primary vessel 12 above the distributor plate 14.

The system 10 of any of these embodiments further comprising a recycle line 43 coupled to the first heat exchanger 50 and a second heat exchanger 52.

The system 10 of any of these embodiments further comprising a holding vessel 30 containing the medium and being fluidly connected to the chamber.

The system 10 of any of these embodiments further comprising
a salvage vessel 70 containing some of the particles and the medium and being fluidly connected to the chamber such that particles and the medium and can be conveyed from the salvage vessel 70 to the chamber,
a third heat exchanger 78 coupled to and extending into the salvage vessel 70,
a second temperature monitoring device 79 coupled to and extending into the salvage vessel 70,
a storage vessel 60 containing some of the particles and being fluidly connected to the chamber such that the particles and the medium can flow from the storage vessel 60 to the chamber,
a storage heat exchanger 68 coupled to and extending into the storage vessel 60, and
a third temperature monitoring device 69 coupled to and extending into the storage vessel 60.

The system 10 of any of these embodiments further comprising a recycle line 43 coupled to the first heat exchanger 50 and the second heat exchanger 52, and a pump 20 fluidly connected to the chamber 13.

The system 10 of any of these embodiments further comprising a computer 28 configured to receive information regarding temperature, pressure and visuals for the system, and to control the pump 20 based on the information received.

What is claimed is:

1. A method of fabrication comprising:
fluidizing particles with a medium to form a fluidized bed having a surface, additively manufacturing an article comprising the particles, the article having an open porosity, forming a plurality of pores in the article that define fluid paths through the article,
flowing the particles and the medium through the fluid paths while the article and the fluid paths are being formed;
providing the particles as first particles and second particles wherein the first particles and the second particles comprise different materials,
temporally varying a ratio of the first particles to the second particles in the fluidized bed, and
additively manufacturing the article having a spatially varied material composition of the first particles and the second particles.

2. The method of claim 1, further comprising simultaneously flowing the particles and the medium through the pores in the article.

3. The method of claim 1, wherein forming the plurality of pores comprises forming interconnected pores.

4. The method of claim 1, further comprising providing the article with a volume, such that the plurality of pores comprises a majority of the volume.

5. The method of claim 1, further comprising:
additively manufacturing a top on the article, and further comprising:
leveling the top of the article with the surface of the fluidized bed such that the fluidized bed envelopes the top and the top is adjacent the surface of the fluidized bed;
continuously lowering the article into the fluidized bed; or continuously raising the surface of the fluidized bed.

6. The method of claim 1, further comprising:
supporting the article on a substrate defining a plurality of channels extending through the substrate, and
flowing particles and the medium through the channels in the substrate.

7. The method of claim 6, further comprising binding the article to the substrate.

8. The method of claim 6, further comprising:
defining the particles with an average diameter $d_p$, and
defining the channels with a minimum diameter of at least about twice the average diameter $d_p$ of the particles.

9. The method of claim 8, wherein the channels have varying diameters.

10. The method of claim 8, wherein the fluid paths have a minimum diameter of at least about twice the average diameter $d_p$ of the particles.

11. The method of claim 1, wherein additively manufacturing further comprises visually monitoring the additive manufacturing within a transparent zone of the fluidized bed, the transparent zone extending a distance D below the surface of the fluidized bed.

12. The method of claim 11, further comprising increasing the distance D of the transparent zone by increasing a velocity of the medium of the fluidized bed.

13. The method of claim 1, wherein the medium is a supercritical fluid.

14. The method of claim 1, wherein fluidizing the particles with the medium to form the fluidized bed further comprises:
conveying the particles into a primary vessel having a top and a bottom and defining a chamber and conveying the particles above a distributor plate extending substantially entirely across the primary vessel adjacent the bottom of the primary vessel, the distributor plate having a plurality of holes, and
pumping the medium through the holes in the distributor plate such that a superficial velocity of the medium is greater than a minimum fluidization superficial velocity $u_{mf}$.

15. The method of claim 1, wherein the fluidized bed is expandable and comprises particles, the particles have an average outer dimension $d_p$ that is at least about 10 microns and not greater than about 1 mm.

16. The method of claim 1, further comprising:
visually monitoring fabrication of the article with a first camera.

17. The method of claim 1, further comprising:
containing at least some of the particles and the medium with a salvage vessel;
fluidly connecting the salvage vessel to the chamber and conveying the particles and the medium from the salvage vessel to the chamber;
a temperature monitoring device coupled to and extending into the salvage vessel, fluidically connecting a storage vessel to the chamber and flowing at least some of the particles and the medium from the storage vessel to the chamber.

18. The method of claim 17, further comprising:
a heat exchanger coupled to and extending into the salvage vessel;
a storage heat exchanger coupled to and extending into the storage vessel, and
another temperature monitoring device coupled to and extending into the storage vessel.

19. The method of claim 1, wherein the medium comprises a gas.

20. A method of fabrication comprising:
fluidizing particles with a medium to form a fluidized bed having a surface, additively manufacturing an article comprising the particles, the article having an open porosity, forming a plurality of pores in the article that define fluid paths through the article;
flowing the particles and the medium through the fluid paths while the article and the fluid paths are being formed;
wherein additively manufacturing further comprises visually monitoring the additive manufacturing within a transparent zone of the fluidized bed, the transparent zone extending a distance D below the surface of the fluidized bed; and
increasing the distance D of the transparent zone by increasing a velocity of the medium of the fluidized bed.

21. A method of fabrication comprising:
fluidizing particles with a medium to form a fluidized bed having a surface, additively manufacturing an article comprising the particles, the article having an open porosity, forming a plurality of pores in the article that define fluid paths through the article;
flowing the particles and the medium through the fluid paths while the article and the fluid paths are being formed;
containing at least some of the particles and the medium with a salvage vessel;
fluidly connecting the salvage vessel to the chamber and conveying the particles and the medium from the salvage vessel to the chamber;
a temperature monitoring device coupled to and extending into the salvage vessel; and
fluidly connecting a storage vessel to the chamber and flowing at least some of the particles and the medium from the storage vessel to the chamber.

* * * * *